United States Patent [19]

Lizell

[11] Patent Number: 5,020,825
[45] Date of Patent: Jun. 4, 1991

[54] METHOD AND APPARATUS FOR ABSORBING MECHANICAL SHOCK

[75] Inventor: Magnus B. Lizell, Stockholm, Sweden

[73] Assignee: Monroe Auto Equipment Company, Monroe, Mich.

[21] Appl. No.: 331,668

[22] PCT Filed: Mar. 18, 1987

[86] PCT No.: PCT/US87/00618
§ 371 Date: Dec. 9, 1988
§ 102(e) Date: Dec. 9, 1988

[87] PCT Pub. No.: WO88/06983
PCT Pub. Date: Sep. 22, 1988

[51] Int. Cl.$^5$ .............................................. B60G 17/01
[52] U.S. Cl. ................................ 280/707; 364/424.05; 188/299
[58] Field of Search ................. 280/707, 703, 714; 188/299, 285, 322.15, 322.11; 364/424.05

[56] References Cited

U.S. PATENT DOCUMENTS

| | | |
|---|---|---|
| 2,717,058 | 9/1955 | Brundrett . |
| 3,039,566 | 6/1961 | Rumsey . |
| 3,124,368 | 3/1964 | Corley ................... 280/840 |
| 4,065,154 | 12/1977 | Glaze .................. 280/707 |
| 4,113,072 | 9/1978 | Palmer ................. 188/282 |
| 4,333,668 | 6/1982 | Hendrickson et al. ............. 280/703 |
| 4,468,050 | 8/1984 | Woods et al. . |
| 4,534,580 | 8/1985 | Kobayashi et al. . |
| 4,600,215 | 7/1986 | Kuroki et al. .......... 280/707 |
| 4,638,896 | 1/1987 | Poyser ................. 188/299 |
| 4,660,686 | 4/1987 | Munning et al. . |
| 4,682,675 | 7/1987 | Eddy, Jr. . |
| 4,695,379 | 9/1987 | Yamamoto et al. . |
| 4,723,640 | 2/1988 | Beck . |
| 4,726,453 | 2/1988 | Obstfelder et al. . |
| 4,732,408 | 3/1988 | Ohlin . |
| 4,741,554 | 5/1988 | Okamoto .............. 280/707 |
| 4,743,046 | 5/1988 | Schnittger ............. 280/707 |
| 4,749,070 | 6/1988 | Moser et al. . |

FOREIGN PATENT DOCUMENTS

| | | |
|---|---|---|
| 0166313 | 6/1984 | European Pat. Off. . |
| 1130621 | 1/1955 | France . |
| 57-173632 | 10/1982 | Japan . |
| 59-128941 | 8/1984 | Japan . |
| 153031 | 7/1986 | Japan ................... 188/299 |
| 8600212 | 5/1985 | PCT Int'l Appl. . |
| 2159917 | 6/1985 | United Kingdom . |

Primary Examiner—Charles A. Marmor
Assistant Examiner—Karin Tyson
Attorney, Agent, or Firm—Harness, Dickey & Pierce

[57] ABSTRACT

A method and apparatus for absorbing mechanical shock is disclosed. The apparatus comprises a pressure cylinder forming a working chamber having first and second portions operable to store damping fluid. The apparatus further comprises a first sensor for generating a first electrical signal in response to the difference in pressure between the damping fluid in the first and second portions of the working chamber. A second sensor is also provided which is able to generate a second electrical signal in response to the movement of the body of the automobile. A computer is used for generating an electrical control signal in response to the first and second electrical signals. Finally, the apparatus further comprises a solenoid for regulating the flow of damping fluid between the first and second portions of the working chamber in response to the output of the computer.

145 Claims, 13 Drawing Sheets

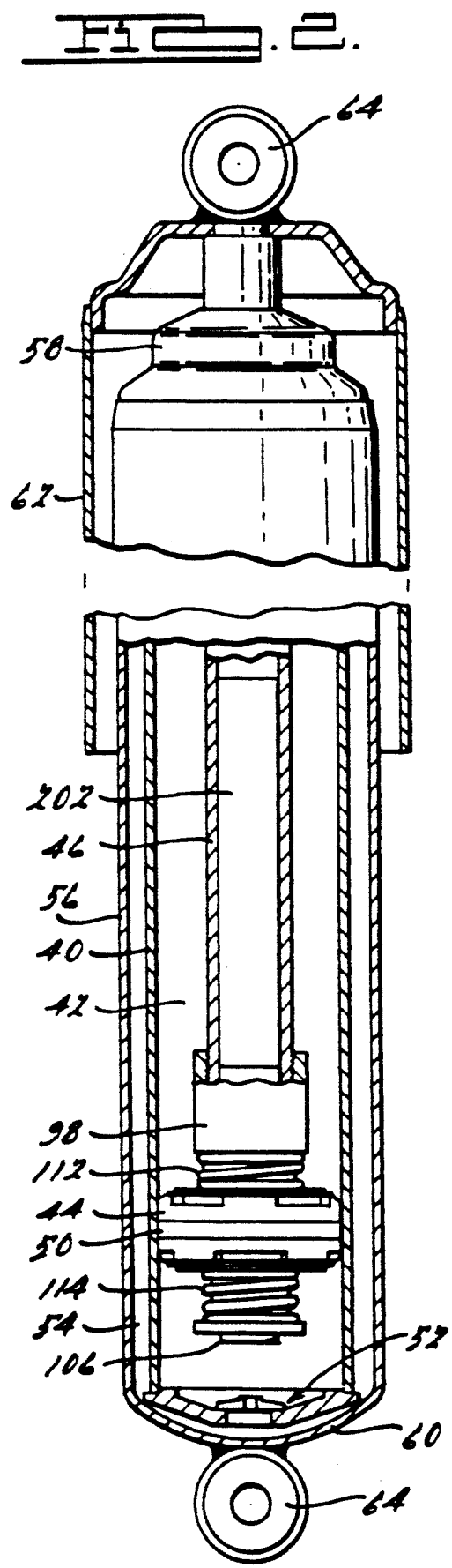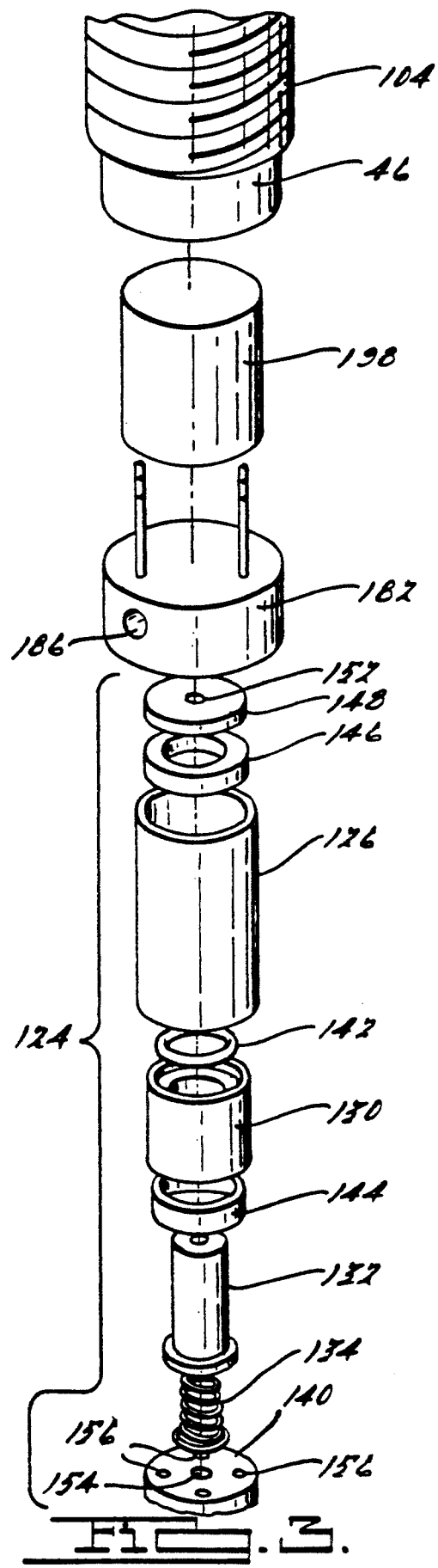

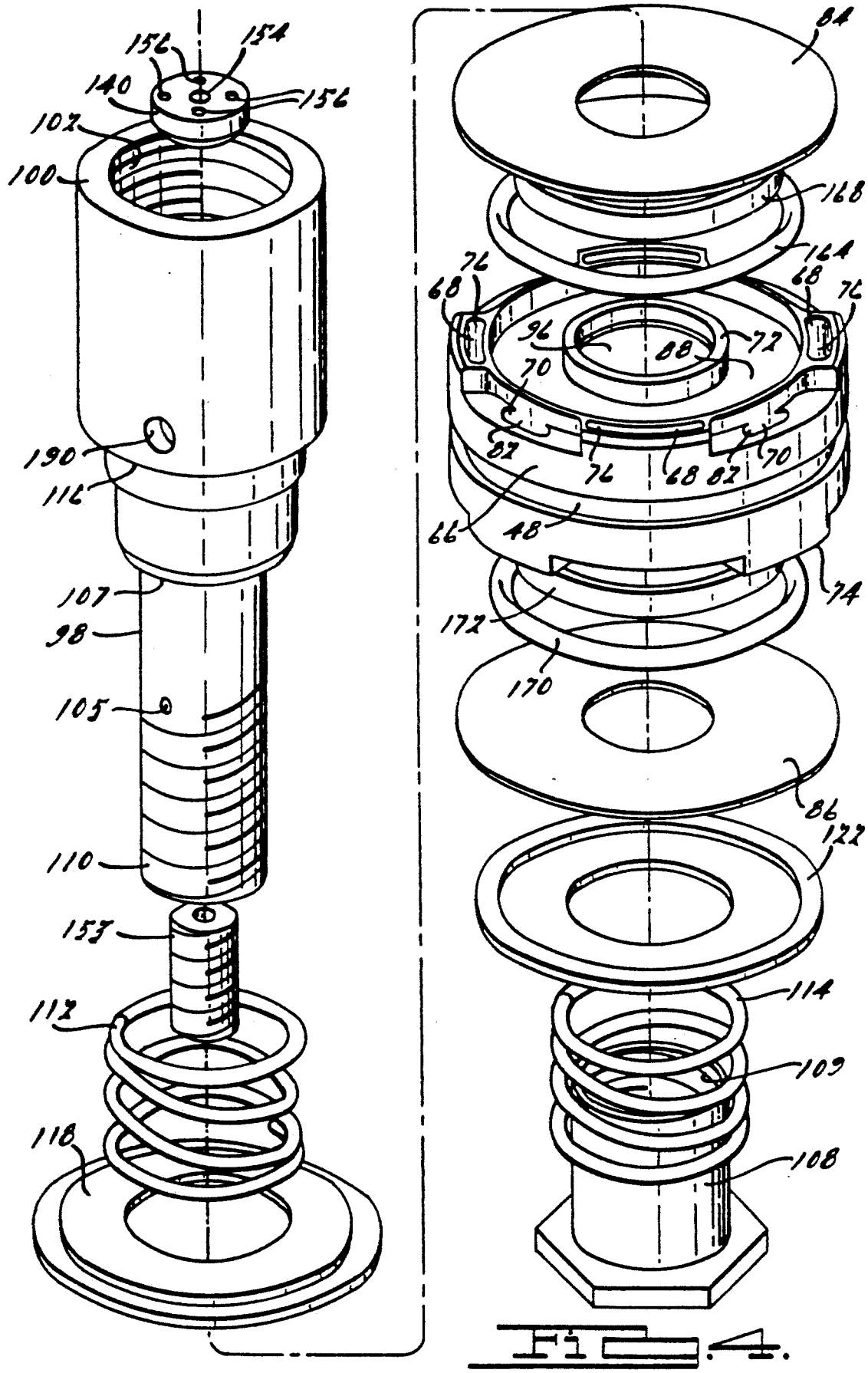

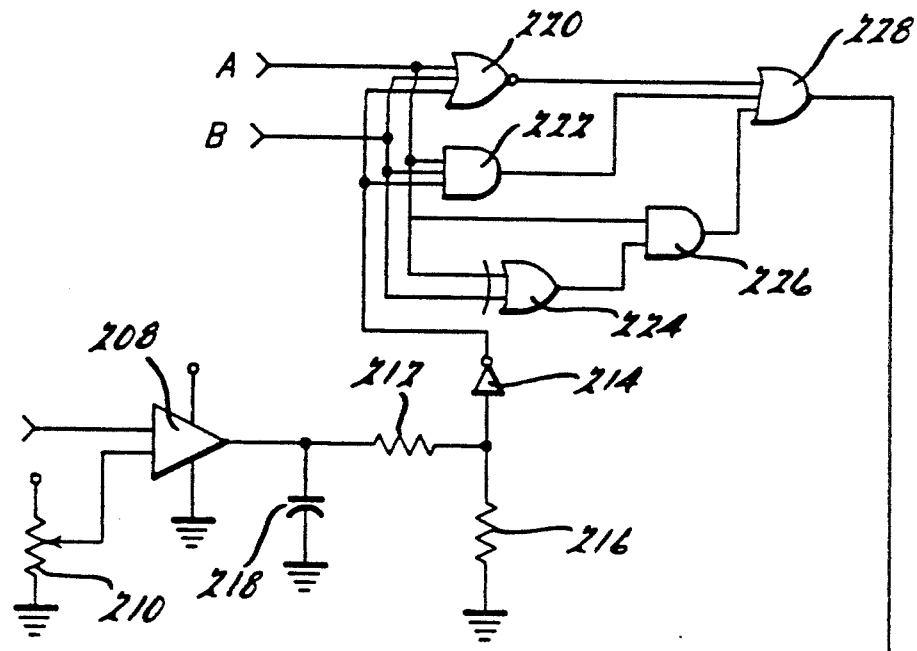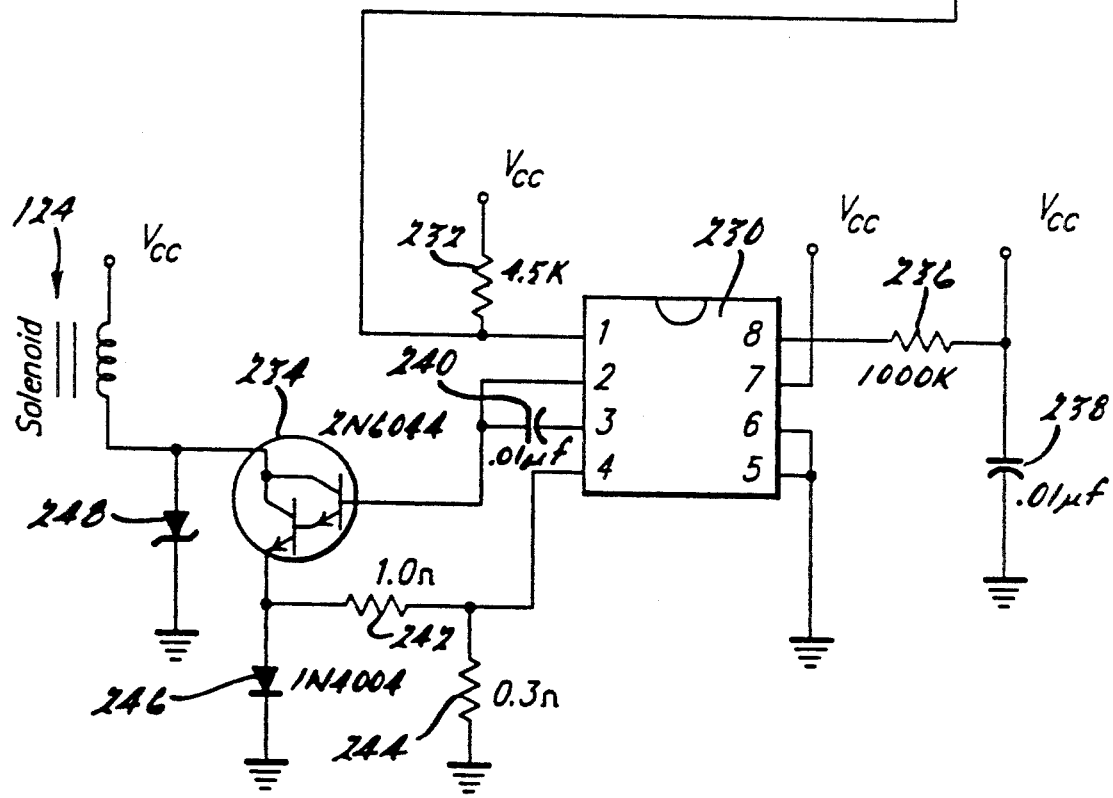
FIG. 11.

METHOD AND APPARATUS FOR ABSORBING MECHANICAL SHOCK

BACKGROUND OF THE INVENTION

1. Field of the Invention

This invention relates to automotive suspension systems, and more particularly to a method and apparatus for absorbing mechanical shock.

2. Description of Related Art

Shock absorbers are used in conjunction with automotive suspension systems to absorb unwanted vibration which occur during driving. To absorb this unwanted vibration, shock absorbers are generally connected between the body and the suspension of the automobile. A piston is located within the shock absorber and is connected to the body of the automobile through a piston rod. Because the piston is able to limit the flow of damping fluid within the working chamber of the shock absorber when the shock absorber is compressed, the shock absorber is able to produce a damping force which counteracts the vibration which would otherwise be transmitted from the suspension to the body. The greater the degree to which the flow of damping fluid within the working chamber is restricted by the piston, the greater the damping forces which are generated by the shock absorber.

In selecting the amount of damping that a shock absorber is to provide, three vehicle performance characteristics are often considered: ride comfort, vehicle handling and road holding ability. Ride comfort is often a function of the spring constant of the main springs of the vehicle, as well as the spring constant of the seat, tires, and the shock absorber. Vehicle handling is related to the variation in the vehicle's attitude (i.e., roll, pitch and yaw). For optimum vehicle handling, relatively large damping forces are required to avoid excessively rapid variation in the vehicle's attitude during cornering, acceleration, and deceleration. Road holding ability is generally a function of the amount of contact between the tires and the ground. To optimize road holding ability, large damping forces are required when driving on irregular surfaces to prevent loss of contact between the wheels and the ground for an excessive period of time.

To optimize ride comfort, vehicle handling, and road holding ability, it is generally desirable to have the damping forces generated by the shock absorber be responsive to the input frequency from the road. When the input frequency from the road is approximately equal to the natural frequency of the body of the automobile (e.g., approximately between 0-2 Hz), it is generally desirable to have the shock absorber provide large damping forces to avoid excessively rapid variation the vehicle's attitude during cornering, acceleration and deceleration. When the input frequency from the road is between 2-10 Hz, it is generally desirable to have the shock absorber provide low damping forces so as to produce a smooth ride and allow the wheels to follow changes in road elevation. When the input frequency from the road is approximately equal to the natural frequency of the automobile suspension (i.e., approximately 10-15 Hz), it may be desirable to have relatively low damping forces to provide a smooth ride, while providing sufficiently high damping forces so as to prevent excessive loss of contact between the wheels and the ground.

One method for selectively changing the damping characteristics of a shock absorber is between the wheels and the ground.

One method for selectively changing the damping characteristics of a shock absorber is disclosed in U.S. Pat. No. 4,597,411. In this reference, a solenoid is used to selectively open and close an auxiliary opening in a base valve of a shock absorber. The base valve then regulates the pressure inside one portion of the working chamber of the shock absorber so as to control damping. Another method for selectively changing the damping characteristics of a shock absorber is disclosed in PCT application PCT/SE86/00212 published Jan. 9, 1987. In one embodiment, this reference discloses the use of a pressure sensor to count the number of compression-rebound cycles of the absorber, as well as an accelerometer attached to the wheel support to determine the vertical velocity of the body of the automobile. The damping characteristics of the absorber are then changed in response to the vertical velocity of the body.

A further method for selectively changing damping characteristics of shock absorbers is disclosed in United Kingdom Patent Application GB 2 147 683 A. In one embodiment, this reference discloses a valve disk which is used to cover channels in a valve body which transfers damping fluid between the upper and lower portions of the working chamber. The valve disk is biased against the valve body by a support member which is disposed partially within a pressure chamber. The pressure chamber communicates with the lower portion of the working chamber through a first flow path, and to the upper portion of the working chamber through a second flow path. To regulate the flow of damping fluid through the second flow path and hence the pressure in the pressure chamber acting on the support member, an auxiliary valve plate is provided. The auxiliary valve plate is disposed over the second flow path and cooperates with a coil which is located on the valve body below a portion of the auxiliary valve plate. When the coil is energized, the magnetic flux generated by the coil produces a biasing force on the auxiliary valve disk causing the auxiliary valve disk to deflect, thereby increasing the opening between the second flow path and the upper portion of the working chamber. Accordingly, when the coil biases the auxiliary valve disk in the position to allow more hydraulic fluid to flow through the second flow path, the pressure of the damping fluid in the pressure chamber declines thereby reducing the force transmitted to the valve plate by the support member. The pressure in the lower portion of the working chamber causes the valve plate to deflect, thereby increasing the amount of damping fluid flowing through the channels.

SUMMARY OF THE INVENTION

Accordingly, it is a primary object of the present invention to provide a method and apparatus for absorbing mechanical shock which is able to permit simultaneous damping of the movement of the body of an automobile as well as the movement of the wheels and axles of the vehicle.

Another object of the present invention is to provide a method and apparatus for absorbing mechanical shock which are able to counteract tendencies of an automobile to roll, pitch or yaw during turning, acceleration, or braking.

It is a further object of the present invention is to provide a method and apparatus for absorbing mechanical shock which are able to provide an acceptable level of friction between the road surface and the tire of an automobile so as to maintain the braking and deceleration capability of the automobile.

Another object of the present invention is to provide a method and apparatus for absorbing mechanical shock which are able to generate an adjustable damping characteristic for the body of an automobile in response to different driving environments and different driving habits.

A further object of the present invention is to provide a new and improved direct acting hydraulic shock absorber having a high degree of flexibility with respect to installation on different models of automobiles. In this regard, a related object of the present invention is to provide an apparatus for absorbing mechanical shock which are relatively low in cost and relatively easy to maintain.

It is a more particular object of the present invention to provide a new and improved shock absorber of the above character which utilizes a solenoid to control the flow of damping fluid through various passages in the apparatus under various operating conditions so as to control the damping forces provided by the apparatus.

Yet another object of the present invention is to provide a shock absorber, as described above, in which the damping forces are controlled by a computer which is responsive to the pressure differential between two portions of the working chamber of the apparatus.

It is another object of the present invention to provide a method and apparatus for absorbing mechanical shock in which the damping forces are controlled by a computer which is responsive to the vertical movement of the body of the vehicle.

An additional object of the present invention is to provide a method and apparatus for absorbing mechanical shock in which the damping forces are controlled by a computer which can be reprogrammed so that the apparatus can provide a different damping characteristic.

BRIEF DESCRIPTION OF THE DRAWINGS

Various advantages of the present invention will become apparent to one skilled in the art upon reading the following specification and by reference to the following drawings in which:

FIG. 2 is a reduced side elevational view, partially broken away, of the apparatus for absorbing mechanical shock shown in FIG. 1 according to the first preferred embodiment of the present invention;

FIGS. 3 and 4 is an enlarged elevated prospective exploded view of the piston according to the first preferred embodiment of the apparatus for absorbing mechanical shock as shown in FIG. 2;

FIG. 11 is a schematic diagram of the driving circuit illustrated in FIG. 10;

FIG. 16 is an enlarged longitudinal cross-sectional view of the apparatus for absorbing mechanical shock shown in FIG. 1 according to the third preferred embodiment of the present invention.

DESCRIPTION OF THE PREFERRED EMBODIMENTS

Figure 1:
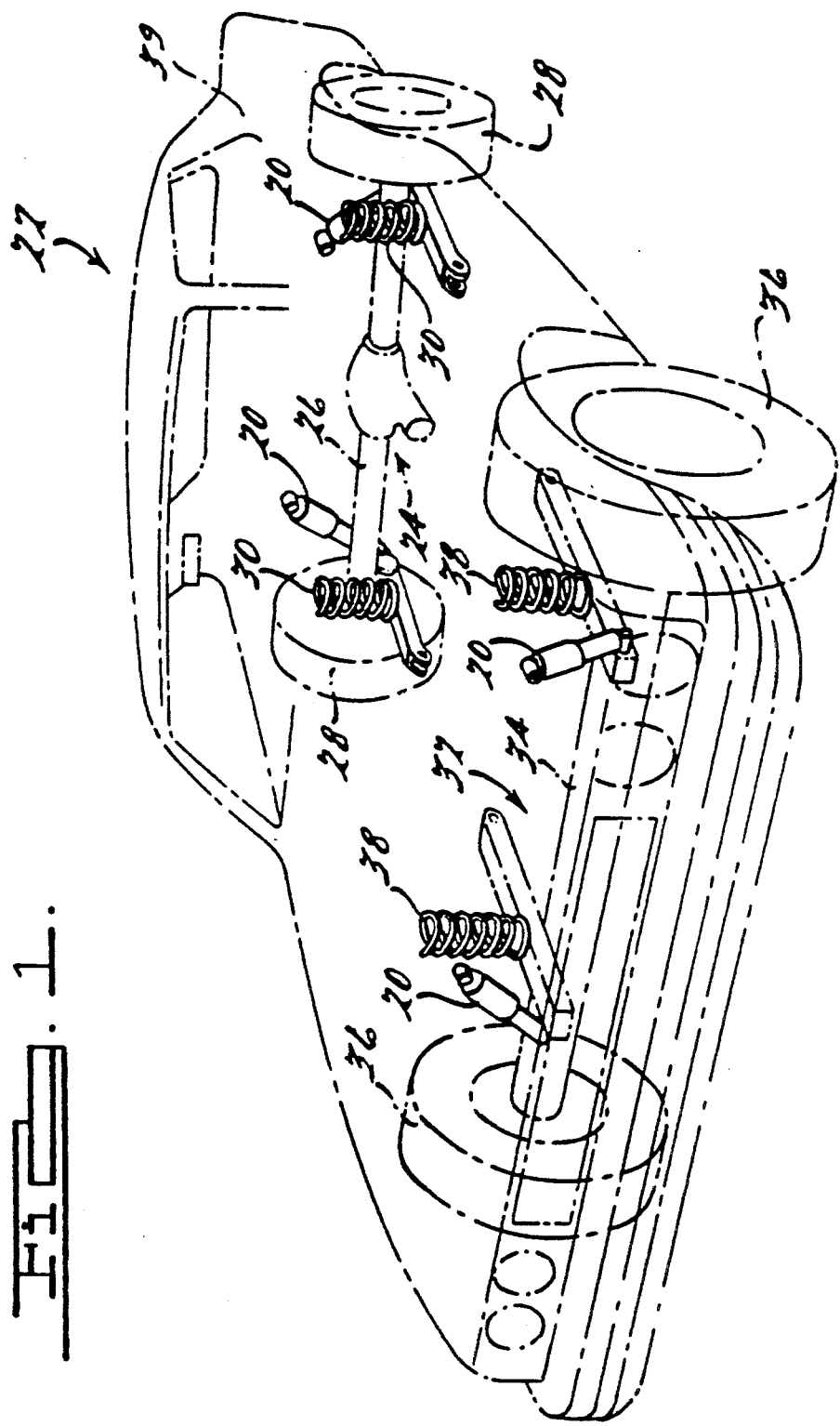
FIG. 1 is the schematic representation of the apparatus for absorbing mechanical shock according to the teachings of the preferred embodiment of the present invention as shown in operative association with the typical automobile.
Figure 5:
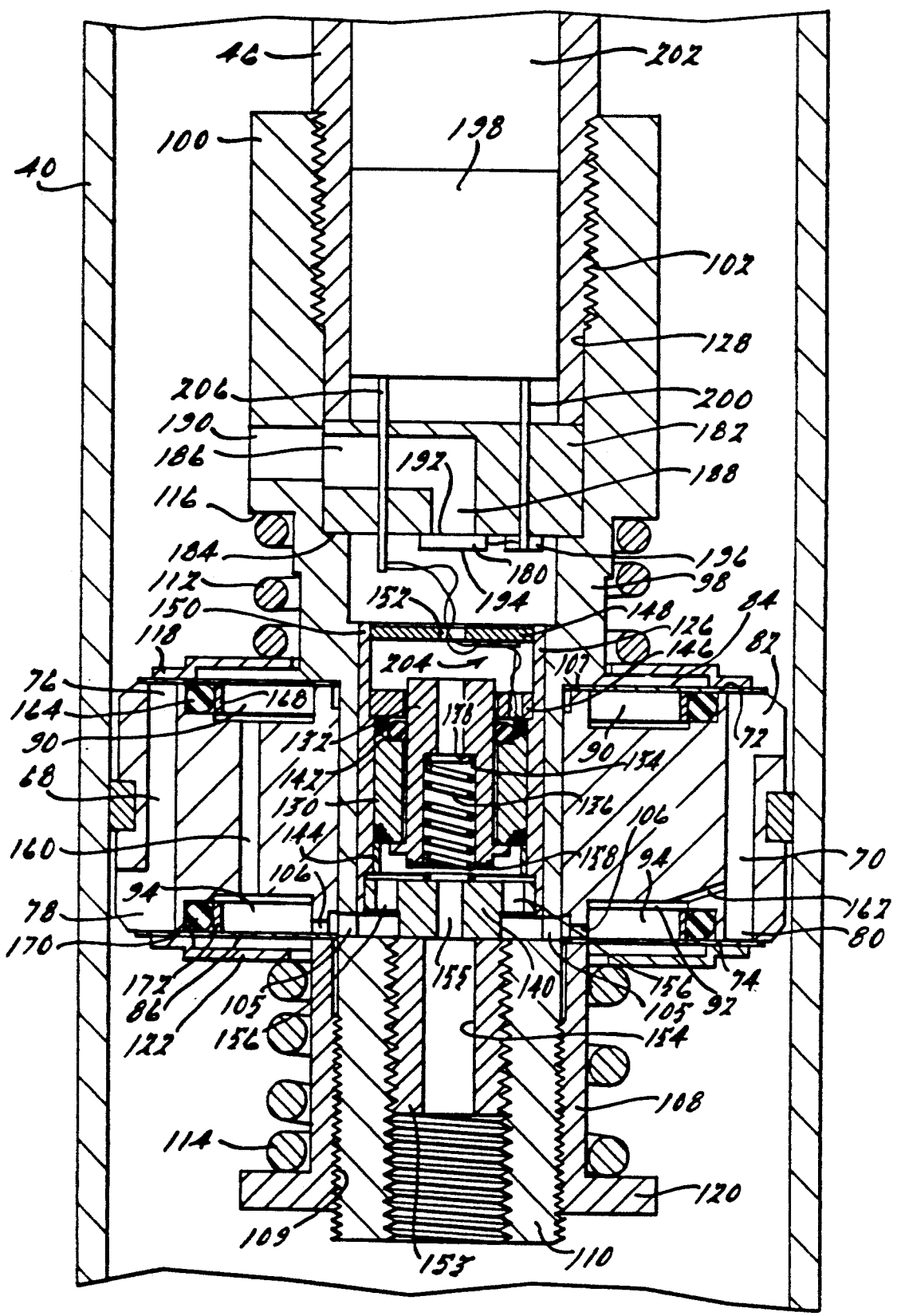
FIG. 5 is an enlarged longitudinal cross-sectional view showing the piston according to the first preferred embodiment of the present invention as shown in FIG. 2.

Referring to FIG. 1, a plurality of four shock absorbers 20 in accordance with the preferred embodiments of the present invention are shown. The shock absorbers 20 are depicted in operative association with a diagrammatic representation of a conventional automobile 22. The automobile 22 includes a rear suspension 24 having a transversely extending rear axle assembly 26 adapted to operably support the vehicle's rear wheels 28. The axle assembly 26 is operably connected to the automobile 22 by means of a pair of shock absorbers 20 as well as by the helical coil springs 30. Similarly, the automobile 22 has a front suspension system 32 including a transversely extending front axle assembly 34 to operatively support the front wheels 36. The front axle assembly 34 is operatively connected to the automobile 22 by means of a second pair of the shock absorbers 20 and by the helical coil springs 38. The shock absorbers 20 serve to damp the relative movement of the unsprung portion (i.e., the front and rear suspensions 32 and 24) and the sprung portion (i.e., the body 39) of the automobile 22. While the automobile 22 has been depicted as a passenger car, the shock absorber 20 may be used with other types of automotive vehicles as well.

With particular reference to FIG. 2, the shock absorber 20 according to the preferred embodiments of the present invention is shown. The shock absorber 20 comprises an elongated tubular pressure cylinder 40 defining a damping fluid containing working chamber 42. Disposed within the working chamber 42 is a reciprocable piston 44 that is secured to one end of an axially extending piston rod 46. The piston 44 includes a circumferential groove 48 operable to retain a piston ring 50 as is well known in the art. The piston ring 50 is used to prevent damping fluid from flowing between the outer periphery of the piston 44 and the inner diameter of the cylinder 40 during movement of the piston 44. A base valve, generally designated by the numeral 52, is located within the lower end of the pressure cylinder 40 and is used to control the flow of damping fluid between the working chamber 42 and an annular fluid reservoir 54. The annular fluid reservoir 54 is defined as the space between the outer periphery of the cylinder 40 and the inner periphery of a reservoir tube or cylinder 56 which is arranged centrally around the exterior of the pressure cylinder 40. The construction and operation of the base valve 52 may be of the type shown and described in U.S. Pat. No. 3,771,626, which is hereby incorporated by reference.

The upper and lower ends of the shock absorber 20 are provided with generally cup-shape upper and lower end caps 58 and 60 respectively. The end caps 58 and 60 are secured to opposing ends of the reservoir tube 56 by a suitable means such as welding. The shock absorber 20 is shown as being provided with a dirt shield 62 which is secured at its upper end to the upper end of the piston rod 46. Suitable end fittings 64 are secured to the upper end of the piston rod 46 and the lower end cap 60 for operatively securing the shock absorber 20 between the body and the axle assembly of the automobile 22. Those skilled in the art will appreciate that, upon reciprocal movement of the piston 44, damping fluid within the pressure cylinder 40 is transferred between the upper and lower portions of the working chamber 42, and between the working chamber 42 and the fluid reservoir 54. By controlling the flow of damping fluid between the upper and lower portion of the working chamber 42, the shock absorber 20 is able to controllably dampen relative movement between the body and the suspension of the automobile 22 so as to optimize both ride comfort and road handling ability. Toward this end, the piston 44 is provided with a new and improved valving arrangement for selectively controlling the flow of damping fluid between the upper and lower portions of the working chamber 42 during reciprocal movement thereof, as will hereinafter be described in detail.

According to the first preferred embodiment of the present invention, the piston 44 comprises a valve body 66 having a first and second plurality of vertical flow passages 68 and 70. The flow passages 68 and 70 extend between the upper surface 72 of the valve body 66 and the lower surface 74 of the valve body 66. Each of the flow passages 68 comprises a valve controlled upper outlet end portion 76 and a lower counter-recessed inlet end portion 78. Similarly, each of the flow passages 70 comprises a valve controlled lower outlet end portion 80 and an upper counter-recessed inlet end portion 82.

To provide means for controlling the flow of damping between the upper and lower portions of the working chamber 42, two valve disks 84 and 86 are provided. The valve disks 84 and 86 are coaxially arranged adjacent to the upper surface 72 and the lower surface 74 of the valve body 66 respectively. The valve disk 84 is of a sufficient diameter so as to register with and cover the outlet end portions 76 of the flow passages 68 thereby preventing damping fluid from entering the outlet end portions 76. However, the valve disk 84 does not cover the counter-recessed inlet end portions 82 of the flow passages 70 so as to allow damping fluid to enter the counter-recessed inlet end portions 82. The valve disk 84 also cooperates with a recessed portion 88 on the upper surface 72 of the valve body 66 so as to form a first pressure chamber 90. Correlatively, the valve disk 86 is of a diameter so as to register with and cover the outlet end portions 80 of the flow passages 70 while not covering the counter-recessed inlet end portions 78. In addition, the valve disk 86 cooperates with a second recessed portion 92 on the lower surface 74 on the valve body 66 to form a second pressure chamber 94.

To support the valve body 66 within the pressure cylinder 40, the valve body 66 has a central bore 96 operable to receive an axially extending piston post 98. The piston post 98 has an upper portion 100 with an internally threaded central bore 102 adapted to threadably engage an externally threaded lower end portion 104 of the piston rod 46. Two radially extending flow passages 105 are disposed on the piston post 98 which communicate with two flow passages 106 which radially extend from the pressure chamber 94 to the central bore 96 of the valve body 66. The flow passages 105 and 106 allow damping fluid to flow between the pressure chamber 94 and the solenoid described below. The piston post 98 further includes a radially extending step 107 having an outside diameter greater than the diameter of the central bore 96. Because the step 107 is disposed above the valve body 66, the step 107 limits upward movement of the valve body 66 relative to the piston post 98. In addition, a piston retaining nut 108 is provided having an internally threaded bore 109 which threadably engages an externally threaded lower portion 110 of the piston post 98 at a position below the valve body 66. Because the outside diameter of the piston retaining nut 108 is greater than the diameter of the central bore 96 of the valve body 66, the nut 108 prevents downward movement of the valve body 66 relative to the piston post 98. The piston post 98 and the piston retaining nut 108 also serve to secure the innermost portions of the valve disks 84 and 86. In this regard, the innermost portion of the valve disk 84 engages both the radially extending step 107 of the piston post 98 and the upper surface 72 of the valve body 66. In addition, the radially innermost portion of the valve disk 86 engages the lower surface 74 of the valve body 66 and the piston retaining nut 108.

To bias the valve disks 84 and 86 against the surfaces 72 and 74 of the valve body 66, a pair of coaxially arranged, axially spaced, helical coil springs 112 and 114 are provided. The spring 112 is disposed coaxially with the piston post 98 between a radially extending step 116 formed on the piston post 98 and an intermediate backing plate 118 which is located coaxially with, and adjacent to, the upper surface of the valve disk 84. By means of the intermediate backing plate 118, the spring 112 is able to resiliently and yieldably bias the valve disk 84 against the upper surface 72 of the valve body 66. Similarly, the spring 114 is disposed between a radially extending flange 120 on the piston retaining nut 108 and an intermediate backing plate 122 which is located adjacent to, and coaxially with, the valve disk 86. The spring 114 is therefore able to resiliently and yieldably biases the valve disk 86 against the lower surface 74 of the valve body 66 via the intermediate backing plate 122.

In accordance with the principles of the present invention, the piston 44 further comprises a solenoid 124 so as to provide an electrical controllable flow means operable to control the actuation of the valve disks 84 and 86. The solenoid 124 includes a housing 126 which is disposed coaxially within the central bore 128 of the piston post 98. Within the housing 126 are disposed a coil 130 and an armature 132 having an enlarged counterbore 134. The armature 132 is biased axially upwardly relative to the valve body 66 by a helical coil spring 136 which is disposed within the counterbore 134. The upper end of the spring 136 bears against a radial surface 138 in the counterbore 134, whereas the lower end of the spring 136 bears against the upper side of a sealing plate 140. An O-ring or similar type sealing element 142 is disposed between the coil 130 and the armature 132 to prevent damping fluid to flow therebetween. An annular ring 144 is provided between the coil 130 and the sealing plate 140 to ensure that the spatial separation between the coil 130 and the sealing plate 140 remains constant.

The solenoid 124 also comprises an annular ring 146 of ferro-magnetic material disposed adjacent to the coil 130 between the armature 132 and the housing 126. The annular ring 146 is used to complete the magnetic flux path generated by the coil 130 to ensure proper operation of the solenoid 124. In addition, the solenoid 124 also comprises an annular housing cap 148 disposed horizontally within the upper portion 150 of the housing 126. The housing cap 148 has a centrally disposed axial flow passage 152 which allows damping fluid inside the housing 126 to flow to one surface of a pressure sensor described below. To secure the solenoid 124 within the piston post 98, an externally threaded solenoid retaining plug 153 is provided. The solenoid retaining plug 153 engages an internally threaded portion lower portion 110 of the piston post 98. The plug 153 comprises an axially extending central bore 154 which allows damping fluid to flow between the sealing plate 140 and the lower portion of the working chamber 42.

The solenoid 124 operatively cooperates with the sealing plate 140 to control the flow of damping fluid between a central flow passage 155 and a plurality of radially displaced flow passages 156 which are disposed on the sealing plate 140. When the solenoid 124 is not energized, damping fluid is able to flow between the central flow passage 155 and the radially displaced flow passages 156. When the solenoid 124 is energized, the armature 132 moves downwardly against the force of the spring 136 to a position in sealing engagement with the sealing plate 140. When this occurs, the armature 132 prevents the flow of fluid between the passages 155 and 156. An O-ring or similar sealing element 158 is provided on the armature 132 which prevents the flow of damping fluid between the armature 132 and the sealing plate 140 when the solenoid 124 is energized.

To allow the fluid flowing through the passages 155 and 156 to counter-bias the valve disks 84 and 86, the valve body 66 further comprises the flow passages 160 and 162. The flow passage 160 extends axially from the pressure chamber 90 to the pressure chamber 94, while the flow passage 162 radially extends from the flow passage 70 to the pressure chamber 94. Because damping fluid in the pressure chamber 94 is able to flow to the radially displaced flow passages 156 on the sealing plate 140 by means of the flow passage 106 in the valve body 66 and the flow passage 105 in the piston post 98, two flow paths are formed within the valve body 66. The first flow path permits damping fluid to flow from the upper portion of the working chamber 42 to the lower portion of the working chamber 42. In this regard, the first flow path allows damping fluid in the upper portion of the working chamber 42 to flow from the vertical flow passage 70 to the pressure chamber 94 through the flow passage 162. Damping fluid in the pressure chamber 94 is therefore able to flow to the radially displaced flow passages 156 on the sealing plate 140 through the flow passage 105 in the piston post 98 and the flow passage 106 in the valve body 66. If the solenoid 124 is not energized, damping fluid flowing through the radially displaced passages 156 is able to flow into the lower portion of the working chamber 42 through the central flow passage 155 of the sealing plate 140 and the central bore 154 of a solenoid retaining plug 153.

The second flow path permits damping fluid to flow between the lower portion of the working chamber 42 and the pressure chamber 90. In this regard, the second flow path allows damping fluid in the lower portion of the working chamber 42 to flow through the central bore 154 of solenoid retaining plug 153 to the central flow passage 155 in the sealing plate 140. If the solenoid 124 is not energized, damping fluid flowing through the central bore 154 is able to flow into the pressure chamber 94 through the radially displaced flow passages 156 on the sealing plate 140, the flow passage 105 in the piston post 98 and the flow passage 106 in the valve body 66. Damping fluid is than able to flow from the pressure chamber 94 to the pressure chamber 90 through the flow passage 160.

To prevent leakage of damping fluid in the pressure chamber 90, an annular retaining seal 164 is provided. The annular retaining seal 164 is disposed within the pressure chamber 90 adjacent to the valve disk 84 so as to prevent damping fluid inside the pressure chamber 90 from entering the upper portion of the working chamber 42. An annular retaining ring 168 is also disposed within the pressure chamber 90 adjacent to the annular retaining seal 164 to ensure that the seal 164 is not displaced in such a manner as to allow hydraulic leakage between the pressure chamber 90 and the upper portion of the working chamber 42. In a similar fashion, an annular retaining seal 170 is disposed within the chamber 94 adjacent to the valve disk 86. The annular retaining seal 170 is used to prevent damping fluid inside the pressure chamber 94 from entering the lower portion of the working chamber 42. An annular retaining ring 172 is also disposed within the pressure chamber 94 adjacent to the annular retaining seal 164 to ensure that the seal 170 is not displaced in such a manner as to permit leakage of damping fluid between the pressure chamber 94 and the lower portion of the working chamber 42.

Figure 6:
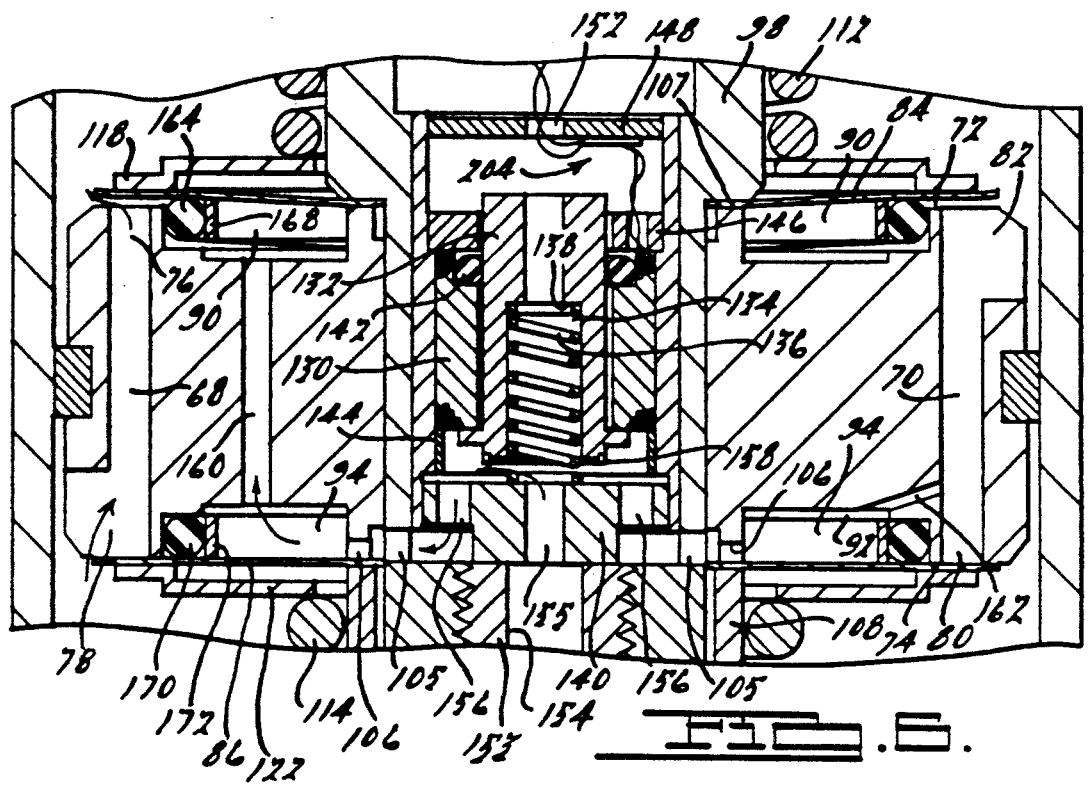
FIGS. 6-9 are enlarged cross-sectional views of the piston shown in FIG. 5 illustrating the operation of the piston according to the first preferred embodiment of the present invention.
Figure 7:
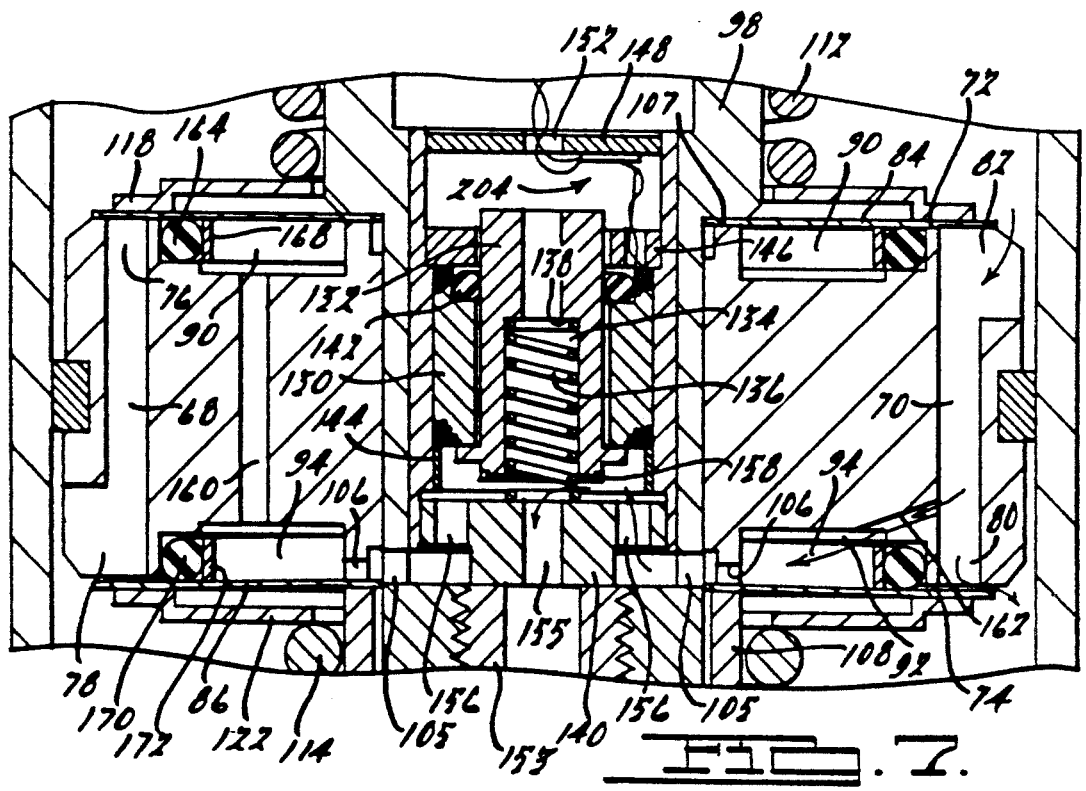
Figure 8:
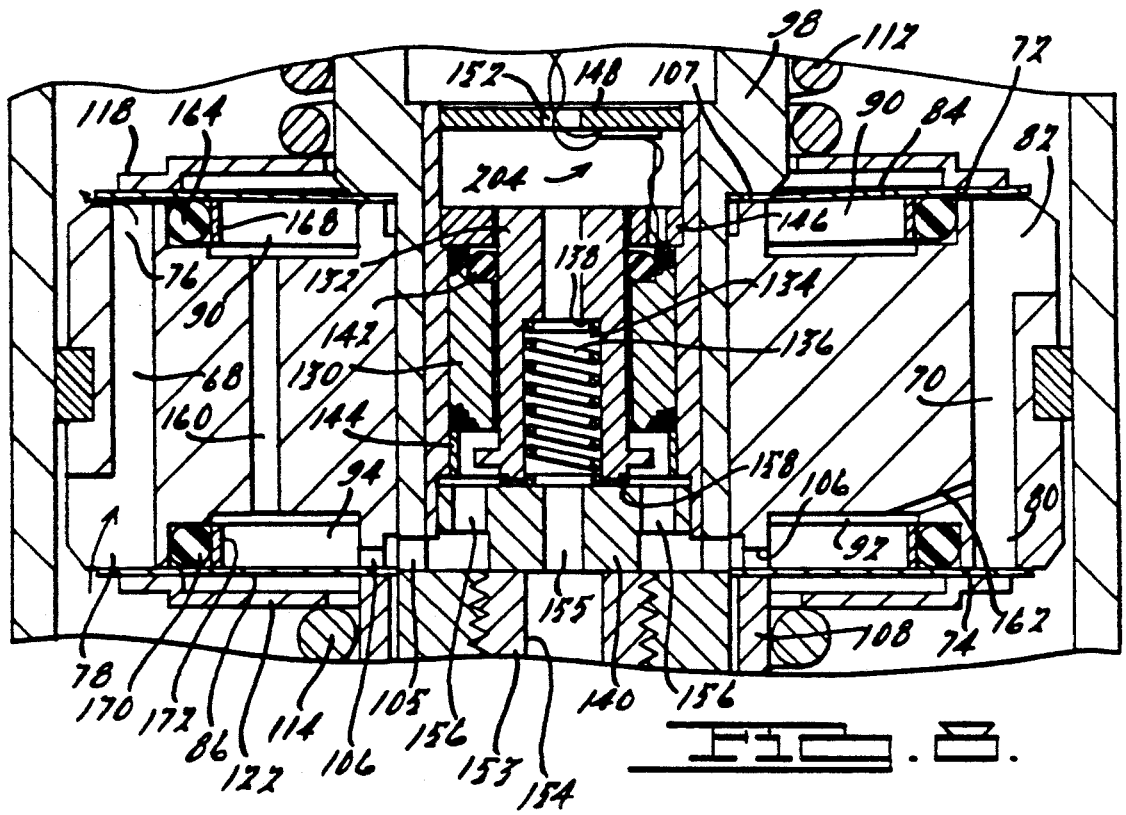

In operation of the shock absorber 20 according to the present invention as shown in FIGS. 6-9, the position of the armature 132 is dependent upon whether the shock absorber 20 is in compression or rebound, and whether a firm or soft stroke is desired. When a soft compression stroke is desired, the solenoid 124 remains idle as shown in FIG. 6, thereby allowing damping fluid in the lower portion of the working chamber 42 to flow through the central bore 154 of the solenoid retaining plug 153 and the flow passages 155 and 156 of the sealing plate 140 to the flow passage 105 in the piston post 98. Damping fluid is than able to flow from the flow passage 105 in the piston post 98 to the pressure chamber 90 through the flow passage 106 in the valve body 66, the pressure chamber 94, and the flow passage 160. Because the flow of damping fluid to the pressure chamber 90 causes the pressure inside the pressure chamber 90 to exceed the pressure in the upper portion of the working chamber 42, a pressure differential is created across the valve disk 84. This pressure differential counter-biases the valve disk 84 so as to allow more damping fluid to flow through the flow passage 68 than would otherwise be permitted. By allowing more damping fluid to flow through the flow passage 68, a soft compression stroke is produced. When a firm compression stroke is desired, the solenoid 124 is actuated as shown in FIG. 8, thereby preventing damping fluid from flowing from the central passage 155 to the radially displaced passages 156 of the sealing plate 140. Because damping fluid in the lower portion of the working chamber 42 is thereby prevented from entering the pressure chamber 90, the pressure inside the pressure chamber 90 is substantially the same as the pressure inside the upper portion of the working chamber 42. Since no pressure differential is created across the valve disk 84 due to the damping fluid inside the pressure chamber 90, no counter-biasing force acts on the valve disk 84 other than that produced by the damping fluid flowing through the flow passage 68. Accordingly, the valve disk 84 allows less fluid to flow through the flow passage 68 so as to produce a firm compression stroke.

Figure 9:
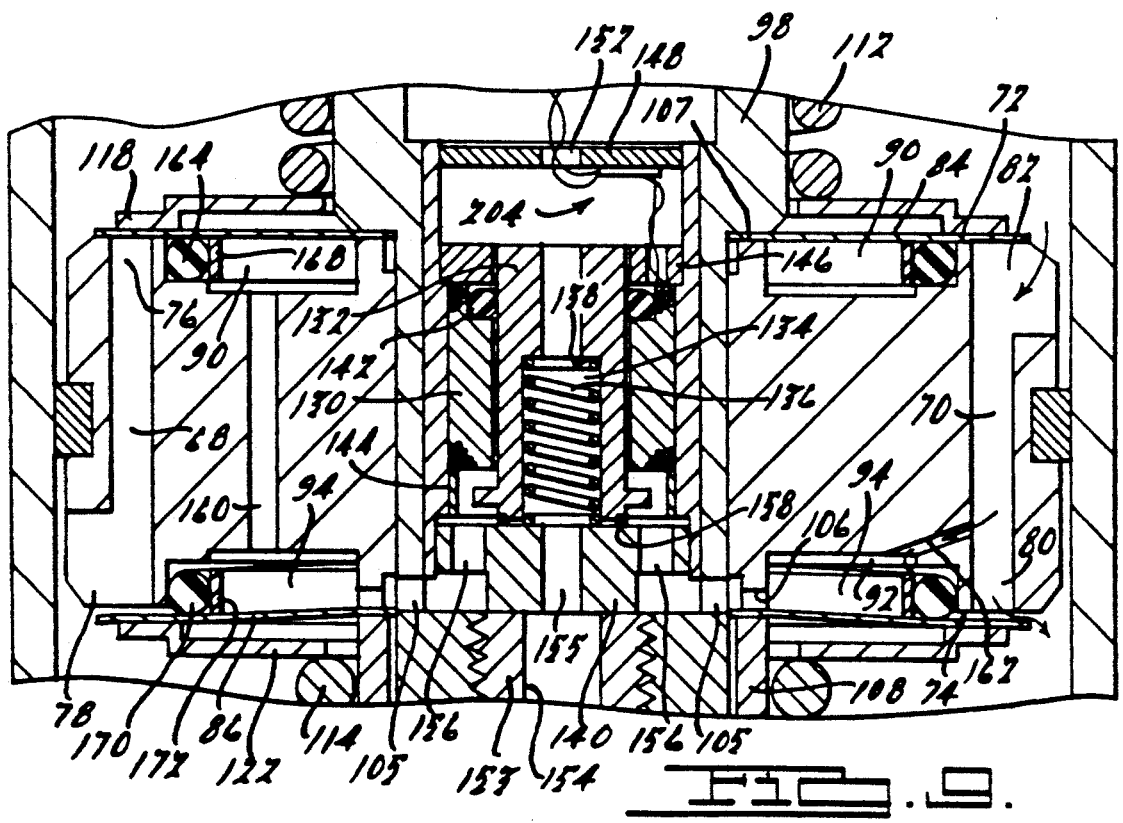

When a firm rebound stroke is desired, the solenoid 124 is not energized as shown in FIG. 7 so that the spring 136 biases the armature 132 in its raised position. Damping fluid from the upper portion of the working chamber 42 which flows into the pressure chamber 94 through the flow passages 70 and 162 in the valve body 66 is therefore able to flow to the radially displaced flow passages 156 in the sealing plate 140 through the flow passage 105 in the piston post 98 and the flow passage 106 in the valve body 66. Because the armature 132 is biased upward, damping fluid flowing to the radially displaced passages 156 is able to flow to the lower portion of the working chamber 42 through the central flow passage 155 in the sealing plate 140 and the central bore 154 of the solenoid retaining plug 153. Because the pressure inside the pressure chamber 94 is therefore substantially the same as the pressure in the lower portion of the working chamber 42, no pressure differential is created across the valve disk 86 due to the damping fluid in the pressure chamber 94. Accordingly, the only counter-biasing force which acts on the valve disk 86 is that provided by the damping fluid flowing through the flow passage 70. Because the counter-biasing force acting on the valve disk 86 is less than would otherwise be provided if the solenoid 124 was energized, fluid flowing through the passage 70 is reduced thereby producing a firm rebound stroke. When a soft rebound stroke is desired, the solenoid 124 is energized as shown in FIG. 9, thereby preventing the flow of damping fluid between the central flow passages 155 and the radially displaced flow passages 156. Accordingly, damping fluid entering the pressure chamber 94 from the upper portion of the working chamber 42 through the flow passages 70 and 162 remains in the pressure chamber 94. The pressure inside the pressure chamber 94 therefore becomes greater than the pressure inside the lower portion of the working chamber 42. Because a pressure differential is created across the valve disk 86, the resulting counter-biasing force acting on the valve disk 86 allows a greater amount of damping fluid to flow through the passage 70 thereby producing a soft rebound stroke.

In accordance with the principles of the present invention, the shock absorber 20 further comprises a pressure sensor 180 to provide means for determining the difference in pressure between the damping fluid in the upper and lower portions of the working chamber 42. The pressure sensor 180 is mounted on an annular member 182 which is disposed within the piston post 98 between the piston rod 46 and a radially inward extending step portion 184 formed within the central bore 128 of the piston post 98. The annular member 182 has a radially extended passage 186 and an axial passage 188 which extends partially through the annular member 182. The radially extended passage 186 communicates with the axial passage 188 at the radially inner end of the radially extended passage 186. The radially extended passage 186 also communicates at its radially outer end with a flow passage 190 formed on the piston post 98. Because the pressure sensor 180 is mounted over the axial passage 188, damping fluid from the upper portion of the working chamber 42 is able to flow to a first surface 192 of the pressure sensor 180 through the passages 190 and 186. In addition, damping fluid in the lower portion of the working chamber 42 is able to flow through the central bore 154 of the solenoid retaining plug 153, the central flow passage 155 in the sealing plate 140, the counterbore 134 of the armature 132, and the flow passage 152 in the housing cap 148 to a second surface 194 of the pressure sensor 180. By virtue of the foregoing structure, the first and second surfaces 192 and 194 of the pressure sensor 180 are in fluid communication with the damping fluid in the first and second portions of the working chamber 42. The pressure sensor 180 is therefore able to generate a signal representing the differential pressure between the damping fluid in the upper and lower portions of the working chamber 42.

To provide means for determining the movement of the body of the automobile 22, an accelerometer 196 is provided which is disposed on the annular member 182. Because the accelerometer 196 is secured to the annular member 182, the accelerometer 196 is able to move in unison with the piston rod 46, and therefore with the body of the automobile 22. Accordingly, the accelerometer 196 is able to generate an electrical signal responsive to the vertical acceleration of the body of the automobile 22. By performing numerical integration on the output from the accelerometer 196, the vertical velocity of the body of the automobile 22 may also be determined.

Figure 10:
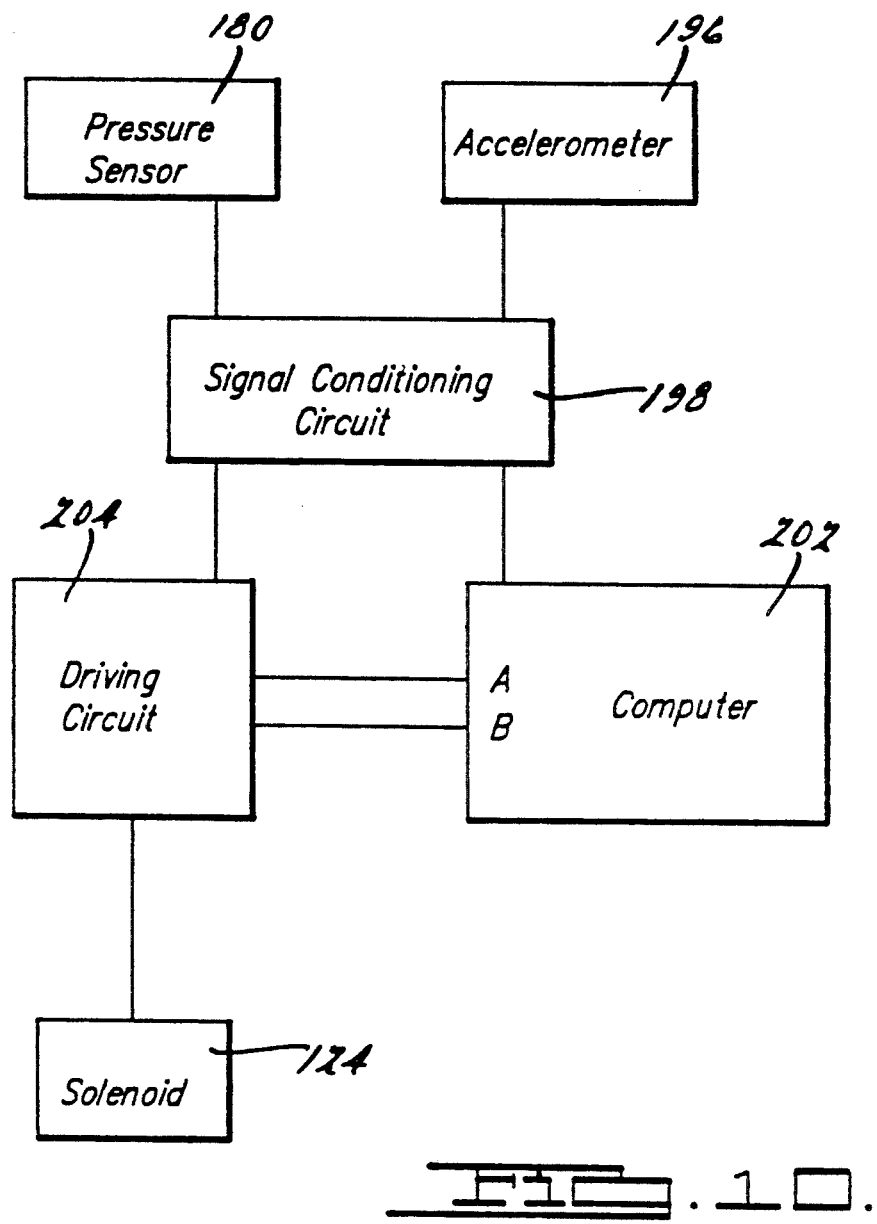
FIG. 10 is an illustration of the manner in which the outputs from the pressure sensor and accelerometer are used to operate the solenoid of the first preferred embodiment of the present invention as shown in FIG. 5.

To provide means for generating an electrical control signal for energizing the solenoid 124 in response to the outputs from the pressure sensor 180 and the accelerometer 196, the shock absorber 20 further comprises a signal conditioning circuit generally designated by the numeral 198 which is disposed within the piston post 98. A first plurality of conductors 200 extend through the annular member 182 to allow electrical communication between the conditioning circuit 198 and the pressure sensor 180 and the accelerometer 196. As shown in FIG. 10, the signal conditioning circuit 198 amplifies the output from the pressure sensor 180 and the accelerometer 196 prior to a delivery to a computer generally designated by the numeral 202. The computer 202 is used to generate an A output and a B output in response to the electrical signals from the output of the signal conditioning circuit 198 according to one of several stored programs described below. The computer 202 generates a logically high or low A output when the compression stroke is to be soft or firm respectively. Similarly, the computer 202 generates electrically high or electrically low B output when the rebound strike is to be soft or firm respectively. The A and B outputs from the computer 202 are then delivered to the solenoid 124 through a solenoid driving circuit generally designated as 204. The solenoid driving circuit 204 is used for converting the output from the computer 202 as well as the output from the signal conditioning circuit 198 into voltage levels which may be used to actuate the solenoid 124. A second plurality of conductors 206 is used for delivering the output from the computer 202 and the signal conditioning circuit 198 through the annular member 182 to the solenoid driving circuit 204.

As shown in FIG. 11, the driving circuit 204 comprises a comparator 208 which receives an output signal from the signal conditioning circuit 198 as well as from an adjustable voltage supply which is represented by the variable resistor 210. The output from the signal conditioning circuit 198 which is delivered to the driving circuit 204 is a voltage responsive to the pressure differential between the upper portion and lower portion of the working chamber 42. When the pressure in the lower portion of the working chamber 42 exceeds the pressure in the upper portion by a predetermined level (i.e., during rebound), a voltage is generated at the output of the signal conditioning circuit 198 which exceeds the voltage delivered by the variable resistor 210. When this occurs, a logical high output is produced at the output of the comparator 208. If the pressure in the lower portion of the working chamber 42 is less than the pressure in the upper portion of the working chamber 42, the voltage delivered by this signal conditioning circuit 198 to the comparator 208 is less than the voltage delivered by the variable resistor 210. When this occurs, a logical low voltage at the output of the comparator 208.

To ensure that the voltage delivered to the various logic gates described below is of a compatible magnitude, the output of the comparator 208 is delivered through a resistor 212 to an inverter 214, and to ground through a resistor 216. The resistors 212 and 216 serve to ensure that the voltage delivered to the inverter 214 is within a range that will enable the inverter 214 to produce a responsive output which is compatible with the other components of the driving circuit 204 described below. The output of the comparator 208 is also connected to the capacitor 218 which serves to filter the relatively high frequency noise present at the output of the comparator 208. The output from the inverter 214 is connected to a NOR gate 220 and an AND gate 222. The NOR gate 220 and the AND gate 222 also receive the A output and the B output of the computer 202. In addition, the A output and the B output are also delivered to an XOR gate 224, and the A output and the output from the XOR gate 224 are delivered to the AND gate 226. Because the output from the gates 220, 222 and 226 are connected to an OR gate 228, the output from the OR gate 228 responds according to the following table:

| Output from Computer 202 | | Output from |
|---|---|---|
| A | B | OR Gate 228 |
| 0 | 0 | P |
| 0 | 1 | 1 (On) |
| 1 | 0 | 0 (Off) |
| 1 | 1 | $\overline{P}$ | where:

P indicates that the solenoid 124 is to be energized when the output from the pressure sensor 180 is positive (i.e., when the piston 44 is in rebound)

$\overline{P}$ indicates that the solenoid 124 is to be energized when the output from the pressure sensor 180 is not positive (i.e., when the piston 44 is in compression)

1 indicates that the solenoid 124 is to be energized during both compression and rebound;

0 indicates that the solenoid is to remain unenergized during both compression and rebound.

Accordingly, when the A output and the B output from the computer 202 are both low, the solenoid driving circuit 204 directs the solenoid 124 to respond directly to the output from the pressure sensor 180. Similarly, if both the A output and the B output are both high, the driving circuit 204 directs the solenoid 124 to follow the inverted output from the pressure sensor 180. If only the B output is high, the driving circuit 204 causes the solenoid 124 to energize, while the solenoid 124 remains unenergized when only the A output is high.

The output from the OR gate 228 is delivered to the IN pin 1 of a drive controller 230. The drive controller 230 is used for controlling the base current delivered to an external power NPN Darlington transistor 234 that drives the solenoid 124. The drive controller 230 initially permits the transistor 234 to provide a sufficiently large current to cause the armature 132 to engage the sealing plate 140. After the armature 132 engages the sealing plate 140, the drive controller 230 reduces the current delivered to the solenoid 124 to a level which maintains the position of the armature 132 relative to the sealing plate 140. To drive the controller 230, the SUPPLY pin 7 of the controller 230 is connected to the supply bus $V_{cc}$ which carries a nominal potential of 5 volts. The TIMER pin 8 of the controller 230 is also connected to the $V_{cc}$ supply bus through a resistor 236, and to ground through the capacitor 238. The values of the resistor 236 and the capacitor 238 determine the time after which the solenoid 124 is initially actuated that the current through the solenoid 124 is reduced.

The OUTPUT pin 2 of the controller 230 is connected to the base of the transistor 234, as well as to one plate of the capacitor 240. The second plate of the capacitor 240 is connected to the COMP pin 3 of the controller 230 so that the capacitor 240 is able to provide stability for the circuit when the solenoid 124 is being held in its actuated state. The SENSE INPUT pin 4 of the controller 230 is connected to the emitter of the transistor 234 through a resistor 242, and to ground through a resistor 244. The resistors 242 and 244 serve to establish the minimum current required to hold the solenoid 124 in its actuated state. A diode 246 is also connected between the emitter of the transistor 234 and ground to ensure that the voltage at the emitter of the transistor 234 is equal to forward bias voltage of the diode 246 (approximately 0.7 volts). To protect the transistor 234 from inductive kickback when the current to the solenoid 124 is reduced, a zener diode 248 is provided. The zener diode 248 provides a path for current from the solenoid 124 when the voltage across the diode 248 exceeds the breakdown potential of the diode 248 (approximately 35 volts). The diode 248 thereby limits the voltage delivered to the collector of the transistor 234 to 35 volts so as to reduce the impact of inductive kickback on the transistor 234.

Figure 12:
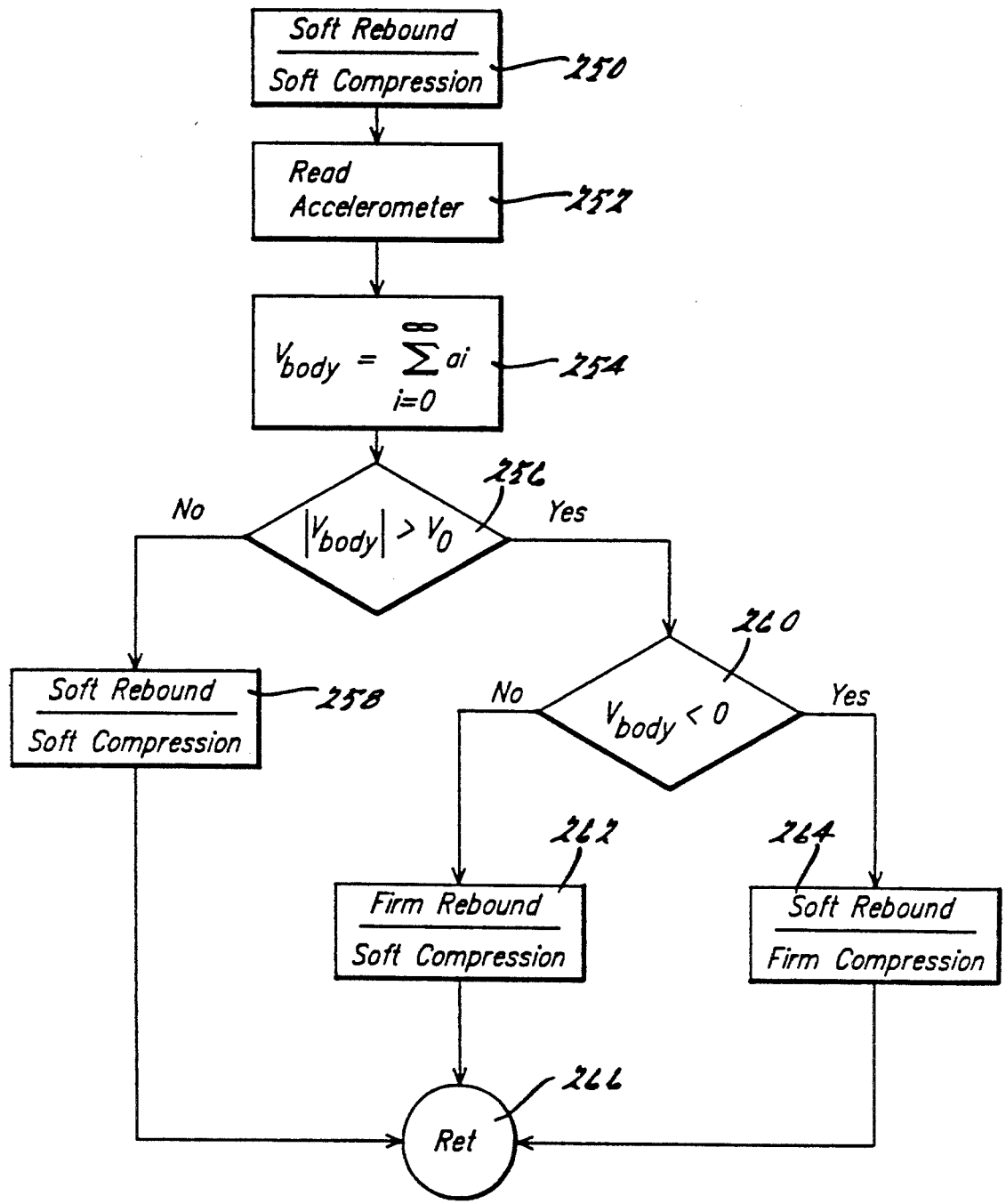
FIG. 12 is a flow chart illustrating a method for damping the movement of the body of an automobile which may be used in conjunction with the apparatus for damping mechanical shock according to the first and second preferred embodiments of the present invention.

The information which is delivered by the accelerometer 196 and the pressure sensor 180 may be used to damp the movement of the vehicle body in the manner shown in FIG. 12. Initially, the compression stroke and the rebound stroke are soft as shown in step 250, indicating that the solenoid 124 remains unactuated during the compression stroke but is actuated during the rebound stroke. At step 252, the output from the accelerometer 196 is read by the computer 202, and is added to the prior acceleration readings at step 254 so as to obtain the vertical velocity $V_{body}$ of the body of the automobile 22. At step 256, the computer 202 determines whether the magnitude of the velocity obtained from the accelerometer 196 is greater than a predetermined value $V_o$ which may typically have a value of 0.05 m/s. If the vertical velocity $V_{body}$ is less than the predetermined value $V_o$, the solenoid 124 remains in its unactuated state during compression and in its actuated state during rebound as shown in step 258. If the magnitude of the vertical velocity of the body of the automobile 22 is greater than the predetermined value $V_o$, the computer 202 then determines at step 260 whether the body of the automobile 22 is moving upward or downward with respect to the road. As shown in step 262, if the vertical velocity $V_{body}$ is positive indicating an upward movement, the solenoid 124 remains unactuated during both the compression and rebound strokes to produce a firm rebound stroke and a soft compression stroke. If the vertical velocity $V_{body}$ is negative, the computer 202 actuates the solenoid 124 during both compression and rebound as shown in step 264. After the response of the solenoid 124 is determined according to the steps 250-264, the processing returns to the step 250 via step 266 or another initial step in another method. By using this method, the shock absorber 20 is able to provide maximum damping when the frequency of the vertical movement of the body of the automobile 22 is substantially equal to 1.5 Hz.

Figure 13:
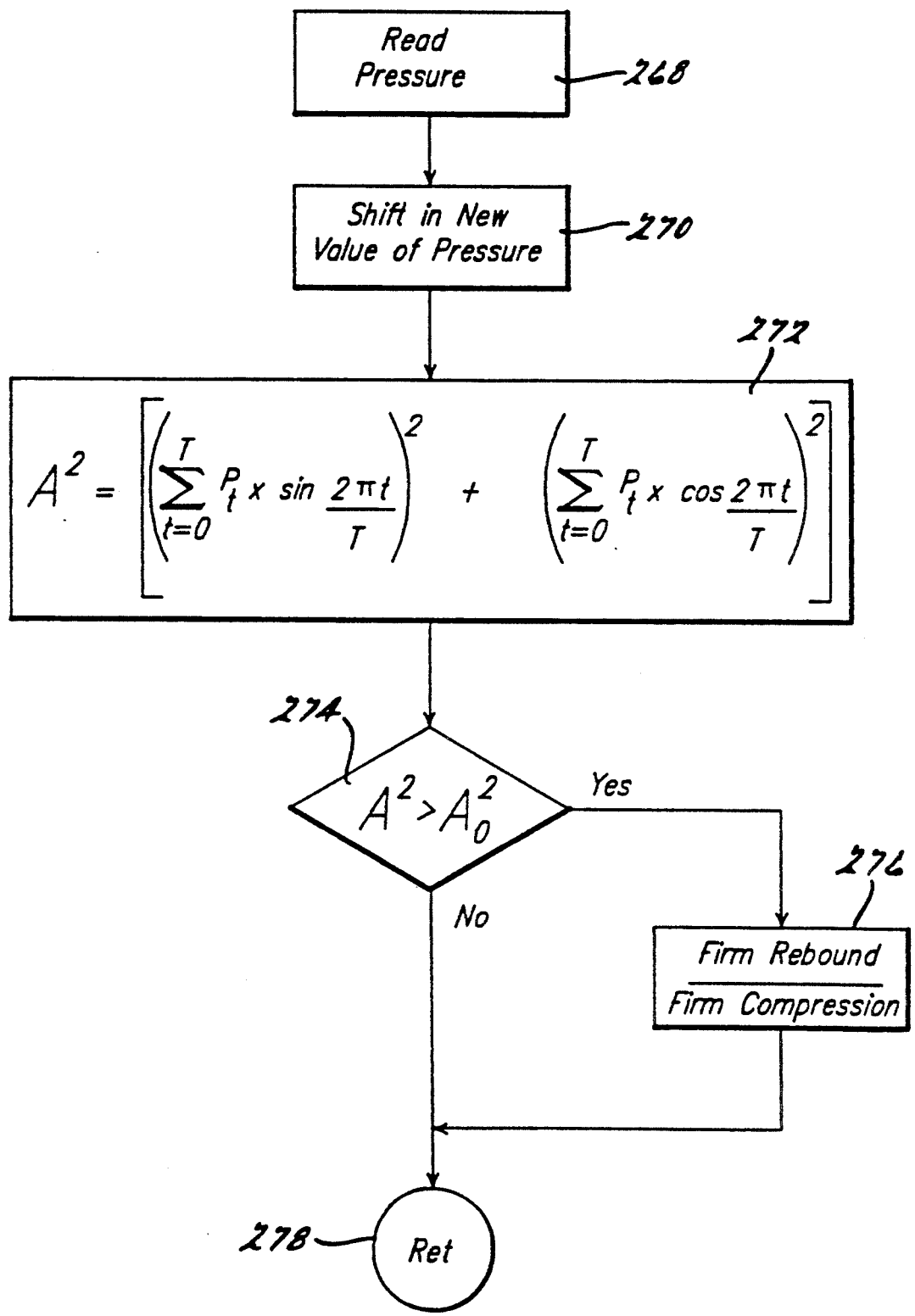
FIG. 13 is a flow chart illustrating a method for minimizing the vibration of the wheel or unsprung mass of an automobile which may be used in conjunction with the apparatus for absorbing mechanical shock according to the first and second preferred embodiments of the present invention.

To minimize the vibration of the body of the automobile 22 due to a natural frequency of the wheels 28 and 36, the computer 202 may be used to control the solenoid 124 in the manner shown in FIG. 13. The pressure differential between the upper and lower portions of the working chamber 42 is initially read at step 268. At step 270, successive pressure measurements are taken during a time interval which is approximately equal to the natural frequency of the wheels (typically 10–15 Hz). The values of the pressure differential are then used to determine the value of $A^2$ at step 272 according to the following equation at step 272:

$$A^2 = \left[ \left( \sum_{t=0}^{T} P_t \times \sin \frac{2\pi t}{T} \right)^2 + \left( \sum_{t=0}^{T} P_t \times \cos \frac{2\pi t}{T} \right)^2 \right]$$

where:

$P_t$ is the differential pressure between the upper portion and the lower portion of the working chamber 42 at time t; and T is the period of the selected natural frequency of the wheels of the automobile 22 (typically 10–15 Hz).

At step 274, the value of $A^2$ is compared with the value of $A_o^2$ which represents a preselected constant chosen to allow the shock absorber to go to firm when the velocity of the piston exceeds 0.4 m/s. It is to be understood, however, that $A_o^2$ may be chosen to optimize a particular ride characteristic. If the value of $A^2$ is greater than the value of $A_o^2$, the solenoid 124 is actuated during compression so as to produce a firm compression stroke, while remaining unactuated during rebound so as to produce a firm rebound stroke as shown in step 276. If the value of $A^2$ is less than or equal to $A_o^2$, then the actuation of the solenoid 124 remains unchanged from its prior state. Processing then returns to step 268 via step 278 or the initial step of another method. By using this method, the shock absorber 20 is able to provide maximum damping when the frequency of the vertical movement of the wheels of the automobile 22 is substantially equal to a value between 10–15 Hz.

Figure 14:
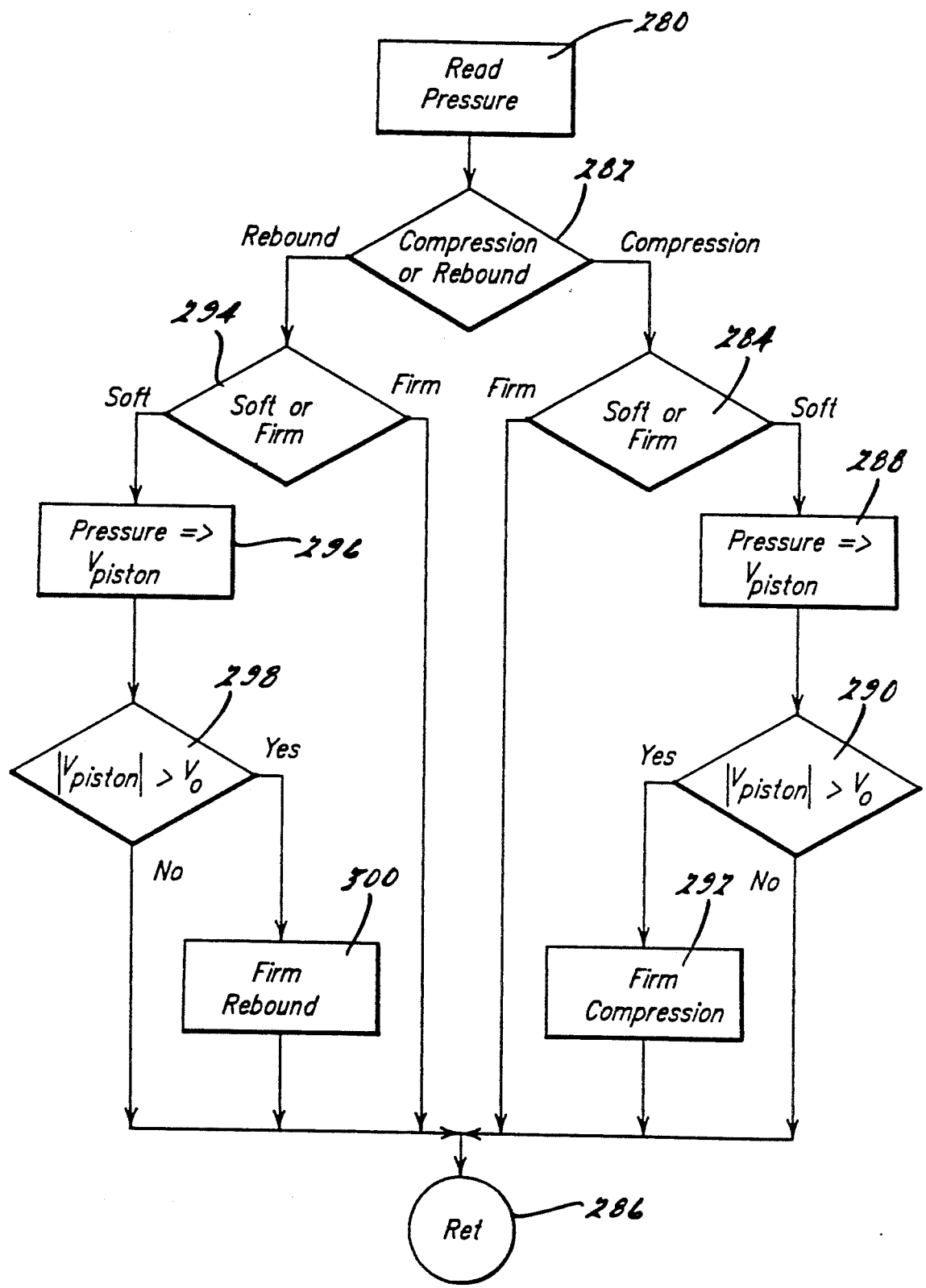
FIG. 14 is a flow chart illustrating a method for preventing excessive axial movement of the piston during compression and rebound which may be used in conjunction with the apparatus for absorbing mechanical shock according to the first and second preferred embodiments of the present invention.

To prevent the piston 44 and the piston rod 46 from excessive axial movement during compression and rebound, the method illustrated in FIG. 14 may be used. At step 280, the pressure differential between the upper and lower portions of the working chamber 42 is recorded. By determining the value of the differential pressure at step 282, the computer 202 determines whether the shock absorber 20 is in compression or rebound. As shown in step 284, if the shock absorber 20 is in compression and the solenoid 124 has been actuated so as to produce a firm compression stroke, the processing returns to step 280 via step 286 or to the initial step of another method. If the compression stroke is soft, the piston velocity $V_{piston}$ is determined at step 288 by comparing the pressure differential recorded by the pressure sensor 180 with a pressure/piston velocity table which is stored in the memory of the computer 202. If the absolute value of the piston velocity $V_{piston}$ is greater than a predetermined value $V_o$ (typically 0.4 m/s) as shown by step 290, the solenoid 124 is deactivated thereby producing a firm compression stroke at step 292. Processing then returns to step 280 via step 286 or to the initial step of another method. If the absolute value of the piston velocity $V_{piston}$ is less than the predetermined value $V_o$, processing also returns to step 280 via the step 286 or the initial step of another method.

If the shock absorber 20 is in rebound as determined at step 282, the computer 202 determines whether the solenoid 124 is producing a firm or soft rebound stroke as illustrated at step 294. If the rebound stroke is firm, the processing returns to the step 280 via the step 286 or an initial step in another method. If the rebound stroke is soft, the piston velocity $V_{piston}$ is determined at step 296 by comparing the pressure differential between the upper and the lower portions of the working chamber 42 to a pressure/piston velocity table which is stored in the memory of the computer 202. As shown at step 298, if the magnitude of the piston velocity $V_{piston}$ is greater than a predetermined value $V_o$, the computer 202 deactivates the solenoid 124 at step 300 to produce a firm rebound stroke. If the magnitude of the piston velocity $V_{piston}$ is less than the predetermined value $V_o$, the processing returns to step 280 via the step 286 or an initial step in another method. By using this method, the shock absorber 20 is able to provide maximum damping when the vertical movement of the wheels of the automobile 22 would otherwise result in over compression or over extension of the shock absorber 20.

Figure 15:
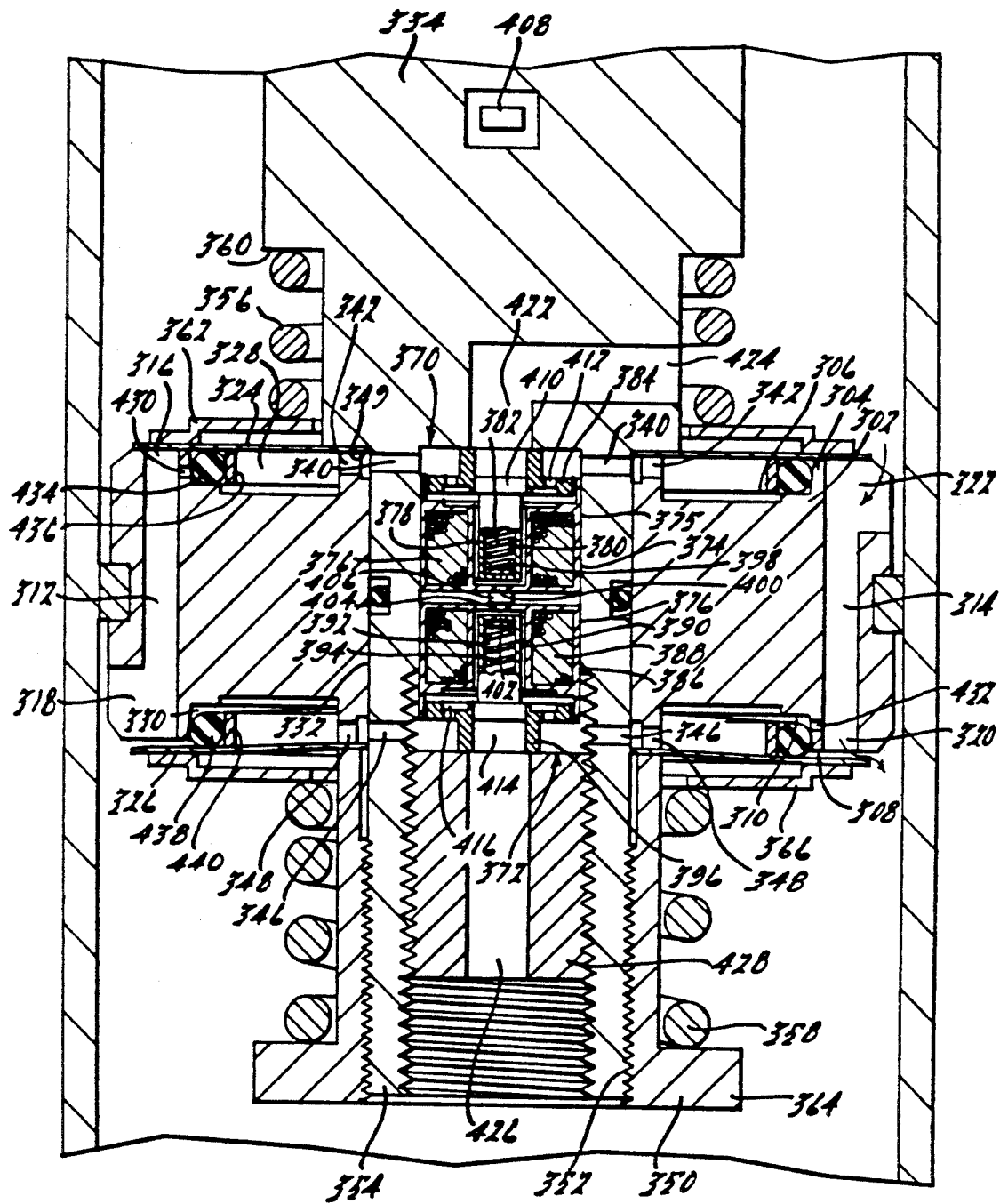
FIG. 15 is an enlarged longitudinal cross-sectional view of the apparatus for absorbing mechanical shock shown in FIG. 1 according to the second preferred embodiment of the present invention.
Figure 18:
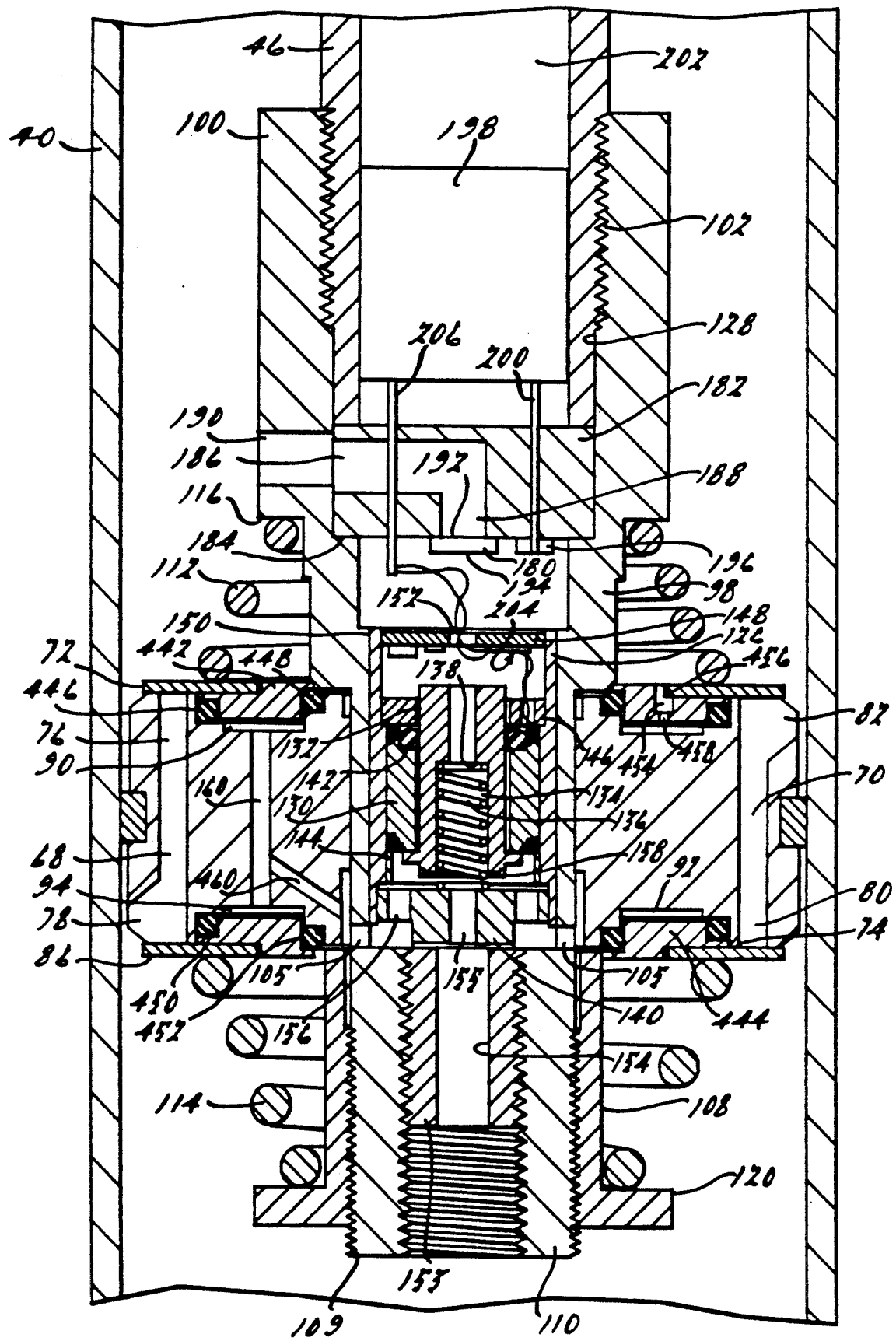

A second preferred embodiment of the present invention is shown in FIG. 15. In this embodiment, the valve body 302 comprises an upper surface 304 with a recess portion 306, and a lower surface 308 with a recess portion 310. To allow fluid communication between upper and lower portions of the working chamber 42, the valve body 302 further comprises a first and second plurality of vertical flow passages 312 and 314. The flow passages 312 and 314 extend between the upper surface 304 of the valve body 302 and the lower surface 308 of the valve body 302. Each of the flow passages 312 comprises a valve controlled outlet end portion 316 which opposes a counter-recessed inlet end portion 318. Similarly, each of the flow passages 314 comprises a valve controlled outlet end portion 320 which opposes a counter-recessed inlet end portion 322.

To provide means for controlling the flow of damping between the upper and lower portions of the working chamber 42, two valve disks 324 and 326 are provided. The valve disks 324 and 326 are coaxially arranged adjacent the upper surface 304 and the lower surface 308 of the valve body 302 respectively. The valve disk 324 is of a sufficient diameter so as to register with and cover the outlet end portions 316 of the flow passages 312 thereby preventing damping fluid from entering the outlet end portions 316. However, the valve disk 324 does not cover the counter-recessed inlet end portions 322 of the flow passages 314 so as to allow damping fluid to enter the counter-recessed inlet end portions 322. The valve disk 324 also cooperates with the recessed portion 306 on the upper surface 304 of the valve body 302 so as to form a first pressure chamber 328. Correlatively, the value disk 326 is of a diameter so as to register with and cover the outlet end portions 320 of the flow passages 314 while not covering the counter-recessed inlet end portions 322. In addition, the valve disk 326 cooperates with a second recessed portion 310 on the lower surface 308 on the valve body 302 to form a second pressure chamber 330.

To support the valve body 302 within the pressure cylinder 40, the valve body 302 has a central bore 332 operable to receive an axially extending piston post 334. The piston post 334 has an upper portion (not shown) with an internally threaded central bore adapted to threadably engage an externally threaded lower end portion of the piston rod 46. An O-ring or similar sealing element 336 is disposed between the valve body 302 and the piston post 334 to prevent damping fluid to flow therebetween. Two radially extending flow passages 340 are disposed on the piston post 334 which communicate with two flow passages 340 in the valve body 302 which radially extend from the pressure chamber 328 to the central bore 332 of the valve body 302. In addition, the piston post 334 also has two radially extending flow passages 346 which communicate with two flow passages 348 which extend from the pressure chamber 330 to the central bore 332 of the valve body 302. The flow passages 340-348 allow damping fluid to flow between the pressure chambers 328 and 330 and one of the solenoids described below. The piston post 334 further includes a radially extending step 349 having an outside diameter greater than the diameter of the central bore 332. Because the step 349 is disposed above the valve body 302, the step 349 limits upper movement of the valve body 302 relative to the piston post 334. In addition, a piston retaining nut 350 is provided having an internally threaded bore 352 which threadably engages an externally threaded lower portion 354 of the piston post 334 at a position below the valve body 302. Because the outside diameter of the piston retaining nut 350 is greater than the diameter of the central bore 332 of the valve body 302, the nut 350 prevents downward movement of the valve body 302 relative to the piston post 334. The piston post 334 and the piston retaining nut 350 also serve to secure the innermost portions of the valve disks 324 and 326. In this regard, the innermost portion of the valve disk 324 engages both the radially extending step 349 of the piston post 334 and the upper surface 304 of the valve body 302. In addition, the radially innermost portion of the valve disk 326 engages the lower surface 308 of the valve body 302 and the piston retaining nut 350.

To bias the valve disks 324 and 326 against the surfaces 304 and 308 of the valve body 302, a pair of coaxially arranged, axially spaced, helical coil springs 356 and 358 are provided. The spring 356 is disposed coaxially with the piston post 334 between a radially extending step 360 formed on the piston post 334 and a backing plate 362 which is located coaxially with, and adjacent to, the upper surface 304 of the valve disk 324. Via the intermediate backing plate 362, the spring 356 is able to resiliently and yieldably bias the valve disk 324 against the upper surface 304 of the valve body 302. Similarly, the spring 358 is disposed between a radially extending flange 364 on the piston retaining nut 350 and a backing plate 366 which is located adjacent to, and coaxially with, the valve disk 326. The spring 358 is thereby able to resiliently and yieldably biases the valve disk 326 against the surface 308 of the valve body 302 by means of the intermediate backing plate 366.

To provide an electrical controllable flow means operable to control the actuation of the valve disks 324 and 326, the piston 44 further comprises a first and second solenoid 370 and 372. The solenoid 370 includes a housing 374 that is disposed within the central bore 375 of the piston post 334. Within the housing 374 are disposed a coil 376 and an armature 378 having enlarged counterbore 380. The armature 378 is axially biased downward relative to the valve body 302 by a helical coil spring 382 which is disposed within the counterbore 380. The lower end of the spring 382 bears against the lower portion of the counterbore 380, whereas the upper end of the spring 382 bears against the lower side of a sealing plate 384. Similarly, the solenoid 372 also includes a housing 386 which is coaxially disposed within the central bore 338 of the piston post 334 at a position below the solenoid 370. Within the housing 386 is disposed a coil 388 and an armature 390 having an enlarged counterbore 392. The armature 390 is biased axially upward relative to the valve body 302 by a helical coil spring 394 which is disposed within the counterbore 392. The upper end of the spring 394 bears against the upper surface of the counterbore 392, whereas the lower end of the spring 394 bears against the upper surface of a sealing plate 396.

The axially lower end of the counterbore 380 of the solenoid 370 has an axial flow passage 398 which is disposed coaxially with an axial flow passage 400 in the housing 374. Similarly, the axially upper end of the counterbore 392 of the solenoid 372 has an axially flow passage 402 which is disposed coaxially with an axial flow passage 404 in the housing 386. Because a pressure sensor 406 is disposed between the housings 374 and 386 adjacent to the flow passages 400 and 404, the pressure sensor 406 is able to determine the pressure differential between the damping fluid in the solenoid 370 and the damping fluid in the solenoid 372. The output from the pressure sensor 406, together with the output from an accelerometer 408, are delivered to the signal conditioning circuit 198 which amplifies the outputs prior to delivery to the computer 202. The computer 202 then generates first and second electrical control signals for controlling the solenoids 370 and 372 via the solenoid driving circuit 204.

The solenoid 370 operatively cooperates with the sealing plate 384 to control the damping fluid between a central fluid passage 410 and a plurality of radially displaced passages 412 which are disposed on the sealing plate 384. When the solenoid 370 is open, damping fluid is able to flow between the central fluid passage 410 and the radially displaced passages 412. When the solenoid 370 is closed, the armature 378 moves downwardly against the force of the spring 382 to a position and sealing engagement with the sealing plate 384. When this occurs, the armature 378 prevents the flow of fluid between the passages 410 and 412. Similarly, the solenoid 372 cooperates with the sealing plate 396 to control the damping fluid between a central fluid passage 414 and a plurality of radially displaced flow passages 416 which are disposed on the sealing plate 396. When the solenoid 372 is open, damping fluid is able to flow between the central fluid passage 414 and the radially displaced flow passages 416. When the solenoid 372 is closed, the armature 390 moves downwardly against the force of the spring 394 to a position in sealing engagement with the sealing plate 396. When this occurs, the armature 390 prevents the flow of fluid between the passages 414 and 416.

The solenoid 370 communicates with the upper portion of the working chamber 42 through an axial passage 422 and a radial passage 424 in the piston post 334. The axial passage 422 extends from the central passage 410 of the sealing plate 384 and communicates with the radial passage 424 at its radially inwardmost end. In addition, the solenoid 372 communicates with the lower portion of the working chamber 42 through the central bore 426 of a solenoid retaining plug 428. The solenoid retaining plug 428 has a threaded exterior surface which threadably engages the lower portion of the piston post 334.

To allow the fluid flowing through the passages 410–418 to counterbias the valve disks 324 and 326, the valve body 302 further comprises the flow passages 430 and 432. The flow passage 430 radially extends from the pressure chamber 328 to the vertical flow passages 312, while the flow passage 432 extends from the pressure chamber 330 to the flow passages 314. Accordingly, damping fluid in the flow passage 312 is therefore able to enter the pressure chamber 328 through the flow passage 430, and damping fluid in the flow passages 314 is able to flow into the pressure chamber 330 through the flow passage 432.

In accordance with the principles of the present invention, it will be seen that two flow paths are created in the valve body 302. The first flow path allows damping fluid entering the flow passages 312 to flow to the upper portion of the working chamber 42. In this regard, the first flow path permits damping fluid in the vertical flow passages 312 to enter the pressure chamber 328 through the flow passage 430. The damping fluid in the pressure chamber 328 then flows to the radially displaced flow passages 412 of the sealing plate 384 through the flow passage 342 in the valve body 302 and the flow passage 340 in the piston post 334. If the solenoid 370 is open, damping fluid at the radially displaced flow passages 412 is able to flow through the second central flow passage 410, the axial flow passage 422 and the radial flow passage 424 to the upper portion of the working chamber 42.

The second flow path permits damping fluid flowing in the vertical flow passage 314 to enter the lower portion of the working chamber 42. In this regard, the second flow path permits damping fluid in the flow passages 314 to enter the pressure chamber 330 through the flow passage 432. The damping fluid in the pressure chamber 330 is therefore able to flow to the radially displaced flow passages 416 in the sealing plate 396 through the radially extended flow passage 346 in the valve body 302 and the radially extending flow passage 348 in the piston post 334. If the solenoid 372 is open, damping fluid delivered to the radially displaced passages 416 of the sealing plate 396 is able to pass through the central fluid passage 314 to the lower portion of the working chamber 42 through the central fluid passage 414 of the solenoid sealing plate 396.

To prevent leakage of damping fluid in the pressure chamber 328, an annular retaining seal 434 is provided. The annular retaining seal 434 is disposed within the pressure chamber 328 adjacent to the valve disk 324 so as to prevent damping fluid inside the pressure chamber 328 from entering the upper portion of the working chamber 42. An annular retaining ring 436 is also disposed within the pressure chamber 328 to ensure that the seal 434 is not displaced in such a manner as to allow hydraulic leakage between the pressure chamber 328 and the upper portion of the working chamber 42. In a similar fashion, an annular retaining seal 438 is disposed within the chamber 330 adjacent to the valve disk 326. The annular retaining seal 438 is used to prevent damping fluid inside the pressure chamber 330 from entering the lower portion of the working chamber 42. An annular retaining ring 440 is also disposed within the pressure chamber 330 to ensure that the seal 438 is not displaced in such a manner as to permit leakage of damping fluid between the pressure chamber 330 and the lower portion of the working chamber 42.

When a large amount of hydraulic fluid is to flow through the flow passage 314 corresponding to a soft rebound stroke, the solenoid 372 is closed thereby preventing fluid from flowing between the central fluid passage 414 and the radially displaced passage 416 of the sealing plate 396. Accordingly, damping fluid in the pressure chamber 328 is unable to flow into the lower portion of the working chamber 42. The pressure in the pressure chamber 330 therefore increases which increases the counter-biasing force applied to the valve disk 326. The valve disk 326 is then deflected from the valve body 302 to a greater extent than would otherwise occur thereby increasing the flow of damping fluid through the flow passage 314. If a firm rebound stroke is desired, the solenoid 372 is opened thereby causing the pressure in the pressure chamber 330 to be substantially equal to the pressure inside the lower portion of the working chamber 42. When this occurs, the counter-biasing force applied to the valve disk 326 is reduced. Less damping fluid is therefore able to flow through the flow passage 314 thereby producing a firm rebound stroke.

When a soft compression stroke is desired, the solenoid 370 is closed thereby preventing the flow of the damping fluid between the central fluid passage 410 and the radially displaced fluid passage 412 in the sealing plate 384. Because fluid is not able to flow between the passages 410 and 412, damping fluid in the pressure chamber 328 is not able to flow into the upper portion of the working chamber 42. Since the pressure of the damping fluid in the pressure chamber 328 becomes greater than the pressure in the upper portion of the working chamber 42, the counter-biasing force applied to the valve disk 324 increases causing a greater deflection in the valve disk 324. This increase in deflection of the valve disk 324 increases the flow of damping fluid through the flow passage 312 thereby producing a soft compression stroke. If a firm compression stroke is desired, the solenoid 370 is opened thereby connecting the pressure chamber 328 to the upper portion of the working chamber 42. Accordingly, the pressure inside the pressure chamber 328 is substantially equal to the pressure inside the upper portion of the working chamber 42, thereby limiting the counter-biasing force applied to the valve disk 326.

In the third preferred embodiment of the present invention shown in FIG. 16, a first and second annular valving members 442 and 444 are provided. The first and second annular valving members 442 and 444 are disposed coaxially within the first pressure chamber 90 and the second pressure chamber 94 respectively. Two annular retaining seals 446 and 448 are disposed between the first annular valving member 442 and the valve body 66 to prevent hydraulic leakage therebetween. Similarly, two annular retaining seals 450 and 452 are disposed between the second annular valving member 444 and the valve body 66 also to prevent hydraulic leakage. The first annular valving member 442 has an unloader port 454 disposed between the first pressure chamber 90 and the upper portion of the working chamber 42. The unloader port 454 has an enlarged diameter portion 456 adjacent to the upper portion of the working chamber 42 which may be used to receive a filter for filtering damping fluid. In addition, the unloader port 454 also has restricted diameter portion 458 which is adjacent to the first pressure chamber 90. While the diameter of the enlarged diameter portion 456 may be 0.050 in and the restricted diameter portion 458 may be 0.013 in, it is to be understood that other suitable diameters may be used. The unloader port 454 functions in the manner similar to the flow passage 162 as described in connection with the first preferred embodiment of the present invention.

In addition, the third preferred embodiment of the present invention has a flow passage 460 which radially extends from the flow passage 105 to the flow passage 160. The flow passage 460 functions in the manner similar to the flow passage 106 as shown in conjunction with the first preferred embodiment of the present invention.

In operation, the damping fluid flows into the flow passage 160 through the flow passage 460 depending on whether the solenoid 124 is open. The damping fluid in the flow passage 160 is then delivered to the first pressure chamber 90 which is thereby able to bias the valve disk 72 to regulate the flow of damping fluid through the vertical flow passage 68. Because the restricted diameter portion 458 of the unloader port 454 is relatively small, the pressure in the first pressure chamber 90 remains relatively constant during compression. During rebound, damping fluid from the upper portion of the working chamber 42 enters the first pressure chamber 90 through the unloader port 454. The damping fluid entering the unloader port 452 is then able to flow from the first pressure chamber 90 to the second pressure chamber 94 through the flow passage 160. Depending on whether the solenoid 124 is open, damping fluid is able to flow from the second pressure chamber 94 to the lower portion of the working chamber 42 through the flow passages 460, 105, 155, and 156, as well as the central bore 154 so that the pressure in the second pressure chamber 94 may be regulated.

While it will be apparent that the preferred embodiments illustrated herein is well calculated to fill the objects stated above, it will be appreciated that the present invention is susceptible to modification, variation and change within departing from the scope of the invention. For example, a single computer may be used to control the damping characteristics of several shock absorbers simultaneously. Other programs may also be used to control the damping characteristics of the automobile 20, and the programs disclosed may be used individually or collectively. In addition, the pressure sensor and the accelerometer may both be located within the solenoid housing. Further, the solenoid may be replaced with other means for opening and closing the control flow to the valves such as a piezoelectric closing element.

What is claimed is:

1. A direct acting hydraulic shock absorber for damping the movement of the body of an automobile comprising:
   a pressure cylinder forming a working chamber having first and second portions operable to store damping fluid;
   a piston disposed within said pressure cylinder between first and second portions of said pressure cylinder;
   a piston support member mechanically communicating with said piston;
   first sensor means for determining the difference in pressure between the damping fluid in said first and second portions of said working chamber so as to sense rebound and compression of said shock absorber, said first sensor means operable to generate a first electrical signal in response to the difference in pressure between the damping fluid stored in said first and second portions, said first sensor means being disposed within said piston support member;
   second sensor means for determining the vertical velocity of the body of said automobile, said second sensor means operable to generate a second electrical signal in response to the movement of the body of said automobile, said second sensor means being disposed within said piston support member;
   means for generating an electrical control signal, said electrical control signal being responsive to whether said shock absorber is in compression or rebound and whether the vertical velocity of the body of said automobile exceeds a predetermined value, and; electrical controllable flow means for regulating the flow of damping fluid between said first and second portions of said working chamber in response to said electrical control signal.

2. The shock absorber as set forth in claim 1, wherein said first sensor means comprises a pressure sensor having a first surface communicating with the damping fluid stored in said first portion of said working chamber, said pressure sensor further having a second surface communicating with the damping fluid stored in said second portion of said working chamber.

3. The shock absorber as set forth in claim 1, wherein said second sensor means comprises an accelerometer.

4. The shock absorber set forth in claim 1, wherein said electrical controllable flow means comprises a solenoid, said solenoid operable to regulate the flow of damping fluid between said first and second portions of said working chamber.

5. A shock absorber of claim 4, wherein said means for generating said electrical control signal comprises a signal conditioning circuit operable to amplify said first and second electrical signals.

6. The shock absorber of claim 5, wherein said means for generating an electrical control signal further comprises a computer electrically communicating with said signal conditioning circuit, said computer operable to generate an output in response to the output of said signal conditioning circuit.

7. The shock absorber of claim 6, wherein said means for generating an electrical control signal further comprises a solenoid driving circuit operable to convert the output of said computer into said electrical control signal which may be used to energize said solenoid.

8. The shock absorber of claim 7, wherein said solenoid driving circuit is operable to convert the output of said signal conditioning circuit into said electrical control signal which may be used to energize said solenoid.

9. A direct acting hydraulic shock absorber for damping the movement of the body of an automobile comprising:
- a pressure cylinder forming a working chamber having first and second portions operable to store damping fluid;
- a piston disposed within said pressure cylinder between first and second portions of said pressure cylinder;
- a piston support member mechanically communicating with said piston;
- first sensor means for determining the difference in pressure between the damping fluid in said first and second portions of said working chamber so as to sense rebound and compression of said shock absorber, said first sensor means being disposed within said piston support member;
- second sensor means for determining the vertical velocity of the body of said automobile, said second sensor means operable to generate a second electrical signal in response to the movement of the body of said automobile, said second sensor means being disposed within said piston support member;
- means for generating first and second electrical control signals in response to said first and second electrical signals;
- first electrical controllable flow means for regulating the flow of damping fluid into said first portion of said working chamber in response to said first electrical control signal, said first electrical controllable flow means being at least partially disposed within said piston; and
- second electrical controllable flow means for regulating the flow of damping fluid into said second portion of said working chamber in response to said second electrical control signal, said second electrical controllable flow means being at least partially disposed within said piston, said first and second electrical controllable flow means being operable to regulate the flow of damping fluid through said piston in response to whether the vertical velocity of the body of said automobile exceeds said predetermined value and whether said shock absorber is in compression or rebound.

10. The shock absorber as set forth in claim 9, wherein said first sensor means comprises a pressure sensor having a first surface communicating with the damping fluid stored in said first portion of said working chamber, said pressure sensor further having a second surface communicating with the damping fluid stored in said second portion of said working chamber.

11. The shock absorber as set forth in claim 9, wherein said second sensor means comprises an accelerometer.

12. The shock absorber set forth in claim 9, wherein said first electrical controllable flow means comprises a first solenoid, said first solenoid operable to regulate the flow of damping fluid into said first portion of said working chamber.

13. The shock absorber set forth in claim 12, wherein said second electrical controllable flow means comprises a second solenoid, said second solenoid operable to regulate the flow of damping fluid into said second portion of said working chamber.

14. The shock absorber as set forth in claim 13, wherein said means for generating first and second electrical control signals comprises a signal conditioning circuit operable to amplify the outputs from said first and second sensor means.

15. The shock absorber as set forth in claim 14, wherein said means for generating first and second electrical control signals further comprises a computer electrically communicating with said signal conditioning circuit, said computer operable to generate an output in response to the output from said signal conditioning circuit.

16. The shock absorber as set forth in claim 15, wherein said means for generating first and second electrical control signals further comprises a solenoid driving circuit operable to convert the output from said computer into voltage levels which may be used to energize said first and second solenoids.

17. The shock absorber of claim 16, wherein said solenoid driving circuit being further operable to convert the output from said signal conditioning circuit into an output which may be used to energize said first and second solenoids.

18. A method for regulating the flow of damping fluid between first and second portions of the working chamber of a direct acting hydraulic shock absorber disposed between the sprung and unsprung portions of a vehicle, said shock absorber having a piston disposed between said first and second portions of said working chamber and a piston support member mechanically communicating with said piston, said method comprising the steps of:
- sensing the pressure differential between said first and second portions of said working chamber to determine whether said shock absorber is in compression or rebound, said step of sensing the pressure differential including the step of recording the output of first sensor means disposed within said piston support member;
- sensing the vertical movement of the sprung portion of said vehicle by recording the output of second sensor means disposed within said piston support member;
- determining whether the vertical velocity of the body of said automobile exceeds a predetermined value;
- regulating the flow damping fluid between said first and second portions of said working chamber through said piston in response to whether the vertical velocity of the body of said automobile exceeds a predetermined value and whether said shock absorber is in compression or rebound.

19. The method of claim 18, wherein said step of sensing the pressure differential between said first and second portions comprises the step of recording the output of a pressure sensor in fluid communication with said first and second portions of said working chamber.

20. The method of claim 19, wherein said step of sensing the vertical movement of the sprung portion of said vehicle comprises the step of recording the output from an accelerometer.

21. The method of claim 20, wherein said step of regulating the flow of damping fluid between said first and second portions of said working chamber comprises the step of delivering damping fluid from said first and second portions to an electrical controllable flow means for regulating the flow of damping fluid between said first and second portions of said working chamber.

22. The method of claim 21, wherein said electrical controllable flow means comprises a solenoid, said solenoid operable to regulate the flow of damping fluid between said first and second portions of said working chamber.

23. The method of claim 22, wherein said step of regulating the flow of damping fluid between said first and second portions of said working chamber comprises the step of delivering the outputs from said pressure sensor and said accelerometer to a signal conditioning circuit operable to amplify the outputs from said pressure sensor and said accelerometer.

24. The method of claim 23, wherein said step of regulating the flow of damping fluid between said first and second portions of said working chamber further comprises the step of delivering the output of said signal conditioning circuit to a computer electrically communicating with said signal conditioning circuit, said computer operable to generate an output in response to the output of said signal conditioning circuit.

25. The method of claim 24, wherein said step of regulating the flow of damping fluid between said first and second portions of said working chamber further comprises the step of delivering the output from said computer to a solenoid driving circuit operable to convert the output of said computer into voltage levels which may be used to energize said solenoid.

26. The method of claim 25, wherein said step of regulating the flow of damping fluid between said first and second portions of said working chamber further comprises the step of delivering the output from said signal conditioning circuit to said solenoid driving circuit operable to convert the output from said signal conditioning circuit into voltage levels which may be used to energize said solenoid.

27. A method for regulating the flow of damping fluid between first and second portions of the working chamber of a direct acting hydraulic shock absorber disposed between the sprung and unsprung portions of the vehicle, said shock absorber having a piston disposed between said first and second portions of said working chamber and a piston support member mechanically communicating with said piston, said method comprising the steps of:

sensing the pressure differential between said first and second portions of said working chamber to determine whether said shock absorber is in compression or rebound, said step of sensing the pressure differential including the step of recording the output of first sensor means disposed within said piston support member;

sensing the vertical movement of the sprung portion of said vehicle by recording the output of second sensor means disposed within said piston support member;

determining whether the vertical velocity of the body of said automobile exceeds a predetermined value;

regulating the flow of damping fluid into said first portion of said working chamber by a first electrical controllable flow means for regulating the flow of damping fluid into said first portion of said working chamber; and regulating the flow of damping fluid into said second portion of said working chamber by a second electrical controllable flow means for regulating the flow of damping fluid into said second portion of said working chamber, said first and second electrical controllable flow means being operable to regulate the flow of damping fluid through said piston in response to whether the vertical velocity of the body of said automobile exceeds said predetermined value and whether said shock absorber is in compression or rebound.

28. The method of claim 27, wherein said step of sensing the pressure differential between said first and second portions comprises the step of recording the output from a pressure sensor in fluid communicating with said first and second portions of said working chamber, said pressure sensor operable to sense the pressure differential between the damping fluid in said first and second portions of said working chamber.

29. The method of claim 28, wherein said step of sensing the vertical movement of the sprung portion of said vehicle comprises the step of recording the output of an accelerometer.

30. The method of claim 29, wherein said first electrical controllable flow means comprises a first solenoid, said first solenoid operable to regulate the flow of damping fluid into said first portion of said working chamber.

31. The method of claim 30, wherein said second electrical controllable flow means comprises a second solenoid, said second solenoid operable to regulate the flow of damping fluid into said second portion of said working chamber.

32. The method of claim 31, wherein said step of regulating the flow of damping fluid into said first portion of said working chamber comprises the step of delivering the output from said pressure sensor and said accelerometer to a signal conditioning circuit operable to amplify the outputs from said pressure sensor and said accelerometer.

33. The method of claim 32, wherein said step of regulating the flow of damping fluid into said first portion of said working chamber further comprises the step of delivering the output from said signal conditioning circuit to a computer electrically communicating with said signal conditioning circuit, said computer operable to generate an output inresponse to the output of said signal conditioning circuit.

34. The method of claim 33, wherein said step of regulating the flow of damping fluid into said first portion of said working chamber further comprises the step of delivering the output of said computer to a solenoid driving circuit operable to convert the output of said computer into voltage levels which may be used to energize said first solenoid.

35. The method of claim 34, wherein said solenoid driving circuit being further operable to convert the output of said signal conditioning circuit into an output which may be used to energize said first solenoid.

36. The method of claim 35, wherein said solenoid driving being further operable to convert the output of said computer into voltage levels which may be used to energize said second solenoid.

37. The method of claim 36, wherein said solenoid driving circuit being further operable to convert the output of said signal conditioning circuit into an output which may be used to energize said second solenoid.

38. A shock absorber for damping the movement of the body of an automobile relative to a wheel of said automobile, said shock absorber having a pressure cylinder with a reciprocating piston disposed therein operable to divide the working chamber formed by said pressure cylinder into first and second portions, said piston mechanically communicating with a piston support member, said shock absorber comprising:

first valve means for controlling the flow of damping fluid between said first and second portions of said working chamber during compression;

second valve means for controlling the flow of damping fluid between said first and second portions of said working chamber during rebound;

first sensor means for determining the difference in pressure between said first and second portions of said working chamber so as to sense rebound and compression, said first sensor means being disposed within said piston support member;

second sensor means for determining the vertical velocity of the body of said automobile, said second sensor means being disposed within said piston support member;

electrical controllable flow means operable to control the actuation of said first and second valve means;

a first flow path between said first and second portions of said working chamber through said electrical controllable flow means;

a second flow path between said second portion of said working chamber and said first valve means through said electrically controllable flow means; and means for controllably actuating said electrical controllable flow means being operable to regulate the flow of damping fluid through said piston in response to whether the vertical velocity of the body of said automobile exceeds said predetermined value and whether said shock absorber is in compression or rebound.

39. The shock absorber of claim 38, wherein said piston support member comprises an axially extending piston rod mechanically communicating with an end fitting, said end fitting operably securing said piston rod to said body of said automobile, said piston being secured to said piston rod by a piston post fixedly secured to said piston rod.

40. The shock absorber of claim 39, wherein said piston rod has an externally threaded end portion adopted to threadably engage an internally threaded central bore portion of said piston post.

41. The shock absorber of claim 39, wherein said piston has a central bore operable to receive said piston post.

42. The shock absorber of claim 39, wherein said piston post comprises a radially extending step portion, said shock absorber further comprising a first spring disposed between said step portion of said piston post and said first valve means, said first spring operable to bias said first valve means against said piston.

43. The shock absorber of claim 42, wherein said shock absorber further comprises a piston retaining nut operable to secure said piston to said piston post, said piston retaining nut having an internally threaded central bore operable to threadably engage an external threaded end portion of said piston post.

44. The shock absorber of claim 43, further comprising a second spring disposed between a radially extending flange on said piston retaining nut and said second valve means, said second spring means operable to bias said second valve means against said piston.

45. The shock absorber of claim 44, wherein said piston comprises a valve body having a first surface perpendicular to the axis of reciprocation of said piston, said first surface having a first recessed portion.

46. The shock absorber of claim 45, wherein said valve body further comprises a second surface perpendicular to the axis of reciprocation of said piston, said first surface having a second recess portion.

47. The shock absorber of claim 46, wherein said first recess portion and said first valve means are operable to form a first pressure chamber, said first valve means operable to increase the flow of damping fluid between said first and second portions of said working chamber during compression of said shock absorber when said pressure in said first pressure chamber exceeds the pressure in said first portion of said working chamber.

48. The shock absorber of claim 47, further comprising a first sealing element disposed within said first pressure chamber, said first sealing element being operable to prevent damping fluid in said first pressure chamber to flow into said first portion of said working chamber.

49. The shock absorber of claim 48, further comprising a first annular retaining ring disposed within said first pressure chamber, said first annular retaining ring being operable to prevent displacement of said first sealing element with respect to said first valve means.

50. The shock absorber of claim 47, wherein said second recess portion and said second valve means are operable to form a second pressure chamber, said second valve means operable to increase the flow of damping fluid between said first and second portions of said working chamber during rebound of said shock absorber when said pressure in said first pressure chamber exceeds the pressure in the second portion of said working chamber.

51. The shock absorber of claim 50, further comprising a second sealing element disposed within said second pressure chamber, said second sealing element operable to prevent damping fluid in said second pressure chamber to flow into said second portion of said working chamber.

52. The shock absorber of claim 51, further comprising a second annular retaining ring disposed within said second pressure chamber, said second annular retaining ring operable to prevent displacement of said second sealing element with respect to said second valve means.

53. The shock absorber of claim 47, wherein said electrical controllable flow means comprises a solenoid.

54. The apparatus of claim 53, wherein said solenoid comprises a sealing plate having a central flow passage and a plurality of radially displaced flow passages, said central flow passage being in fluid communication with said second portion of said working chamber and said radially displaced flow passages being in fluid communication with said second pressure chamber.

55. The shock absorber of claim 54, wherein said solenoid further comprises an armature operable to engage said sealing plate when said solenoid is closed.

56. The shock absorber of claim 55, wherein said armature is operable to prevent the flow of damping fluid between said central flow passage and said radially displaced flow passages when said solenoid is closed.

57. The shock absorber of claim 56, wherein said solenoid further comprises a spring operable to bias said armature in a direction opposing said sealing plate.

58. The shock absorber of claim 57, wherein said armature has a central bore operable to permit damping fluid from said second portion of said working chamber to flow therethrough.

59. The shock absorber of claim 58, wherein said solenoid further comprises a solenoid housing and a housing cap, said housing cap having an axial flow passage in fluid communication with said central bore of said armature.

60. The shock absorber of claim 59, wherein said piston further comprises an annular member disposed within said piston post between said piston rod and said solenoid housing.

61. The shock absorber of claim 60, wherein said annular member has an axial flow passage and a radially extending flow passage, said radially extending flow passage permitting fluid communication between the first portion of said working chamber and said axial flow passage through a flow passage in said piston post.

62. The shock absorber of claim 61, wherein said pressure sensor has a first surface communicating with said axial flow passage of said annular member, said pressure sensor having a second surface in fluid communication with the axial flow passage in said housing cap.

63. The shock absorber of claim 62, wherein said valve body comprises a first plurality of vertical flow passages operatively associated with said first and second valve means to permit damping fluid to flow from said first portion of said working chamber to said second portion of said working chamber when the pressure of the damping fluid in said first portion of said working chamber is greater than the pressure of the damping fluid in said second portion.

64. The shock absorber of claim 63, wherein said valve body comprises a second plurality of vertical flow passages, said second plurality of vertical flow passages operatively associated with said first and second valve means to permit damping fluid to flow from said second portion of said working chamber to said first portion when the pressure of the damping fluid in said second portion is greater than the pressure of the damping fluid in said first portion.

65. The shock absorber of claim 64, wherein said first flow path comprises a flow passage between one of said second plurality of vertical flow passages in said valve body and said second pressure chamber, said first flow path further comprising a flow passage in said valve body mating with a flow passage in said piston post operable to allow damping fluid in said second pressure chamber to flow into said radially displaced flow passages in said sealing plate.

66. The shock absorber of claim 65, wherein said first flow path further comprises said radially displaced flow passages in said sealing plate.

67. The shock absorber of claim 66, wherein said second flow path comprises a flow passage between said first pressure chamber and said second pressure chamber, said second flow path further comprising said flow passage in said valve body mating with a flow passage in said piston post.

68. The shock absorber of claim 67, wherein said second flow path further comprises said radially displaced flow passages in said sealing plate.

69. The direct acting shock absorber for damping the movement of the body of an automobile comprising:
a pressure cylinder forming a working chamber with first and second portions operable to store damping fluid;
a piston disposed within said pressure cylinder between said first and second portions of said working chamber, said piston in fluid communicating with said second portion of said working chamber;
means for supporting said piston within said pressure cylinder, said means for supporting said piston being in fluid communication communicating with said first portion of said working chamber;
first sensor means for determining the difference in the pressure between the damping fluid in said first and second portions of said working chamber so as to sense rebound and compression, said first sensor means operable to generate first electrical signal in response to the difference in pressure between the damping fluid stored in said first and second portions, said first sensor means being disposed within said means for supporting said piston;
second sensor means for determining the vertical velocity of the body of said automobile, said second sensor means operable to generate a second electrical signal in response to the movement of the body of said automobile, said first sensor means being disposed within said means for supporting said piston;
means for generating electrical control signal in response to said first and second electrical signals, said electrical control signal being responsive to whether said shock absorber is in compression or rebound and to whether the vertical velocity of the body of said automobile exceeds a predetermined value; and
electrical controllable flow means for regulating the flow of damping fluid between said first and second portions of said working chamber through said piston in response to said electrical control signal.

70. The shock absorber of claim 69, wherein said means for supporting said piston comprises a piston post with a central bore, said piston post having a flow passage between said first portion of said working chamber and said central bore.

71. The shock absorber of claim 70, wherein said apparatus further comprises an annular member disposed within said piston post, said annular member having a flow passage in fluid communication with first flow passage in said piston post and said first sensor means.

72. The shock absorber of claim 71, wherein said first sensor means being in mechanical communication with said annular member.

73. The shock absorber of claim 72, wherein said electrical controllable flow means includes a flow passage in fluid communication with the second portion of said working chamber, said first sensor means in fluid communication with said flow passage in said electrical controllable flow means.

74. A shock absorber for damping the movement of the body of an automobile, said shock absorber having a piston supported by a piston support member, said shock absorber comprising:

a pressure cylinder forming a working chamber having first and second portions operable to store damping fluid;

first sensor means for determining the difference in pressure between the damping fluid in said first and second portions of said working chamber, said first sensor means operable to generate a first electrical signal in response to whether the shock absorber is in compression or rebound, said first sensor means being disposed within said support member;

second sensor means for determining movement of the body of said automobile, said second sensor means operable to generate a second electrical signal in response to the vertical movement of the body of said automobile, said first sensor means being disposed within said piston support member;

means for generating an electrical control signal in response to said first and second electrical signals, said means for generating an electrical control signal operable to record the output of said first sensor means and determine whether said shock absorber is in compression or rebound, said means for generating an electrical control signal being further operable to determine whether the vertical velocity of the body of said automobile exceeds a predetermined value;

first electrical controllable flow means for regulating the flow of damping fluid between said first and second portions of said working chamber through said piston, said first electrical controllable flow means disposed within said pressure cylinder and being operable to regulate the flow of damping fluid during compression of said shock absorber; and second electrical controllable flow means for electrically regulating the flow of damping fluid between said first and second portions of said working chamber through said piston in response to said electrical control signal, said second electrical controllable flow means disposed within said pressure cylinder and being operable to regulate the flow of damping fluid during the rebound of said shock absorber.

75. The shock absorber of claim 74, wherein said first electrical controllable flow means comprises a first solenoid, said first solenoid operable to regulate the flow of damping fluid into said first portion of said working chamber.

76. The shock absorber of claim 75, wherein said second electrical controllable flow means further comprises a second solenoid, said second solenoid operable to regulate the flow of damping fluid into said second portion of said working chamber.

77. The shock absorber of claim 76, wherein said means for generating an electrical control signal comprises signal conditioning circuit operable to amplify the outputs from said first and second sensor means.

78. The shock absorber of claim 77, wherein said means for generating an electrical control signal comprises a computer, said computer operable to generate an output in response to the output of said signal conditioning circuit.

79. The shock absorber of claim 78, wherein said means for generating an electrical control signal further comprises a solenoid driving circuit operable to convert the output of said computer into voltage levels which may be used to energize said first solenoid.

80. The shock absorber of claim 79, wherein said solenoid driving circuit is further operable to convert the output of said signal conditioning circuit into an output which may be used to energize said first solenoid.

81. The shock absorber of claim 80, wherein said solenoid driving circuit is further operable to convert the output of said computer into voltage levels which may be used to energize said second solenoid.

82. The shock absorber of claim 81, wherein said solenoid driving circuit is further operable to convert the output of said signal conditioning circuit into an output which may be used to energize said second solenoid.

83. The shock absorber of claim 74, wherein said shock absorber further comprises a valve body and a first and a second valve disk biased against opposing surfaces of said valve body, said valve body having a first plurality of vertical flow passages operatively associated with said first and second valve disks to permit damping fluid to flow from said first position of said working chamber to said second portion of said working chamber when the pressure of the damping fluid in said first portion of said working chamber is greater than the pressure of the damping fluid in said second portion.

84. The shock absorber of claim 83, wherein said valve body further comprises a second plurality of vertical flow passages, said second plurality of vertical flow passages operatively associated with said first and second valve disks to permit damping fluid to flow from said second portion of said working chamber to said first portion of said working chamber when the pressure of the damping fluid in said second portion is greater than the pressure of the damping fluid in said first portion.

85. The shock absorber of claim 84, wherein said valve body further comprises a first recessed portion cooperating with said first valve disk to create a first pressure chamber, said first solenoid operable to selectively increase the pressure inside said first pressure chamber so as to create a pressure differential on opposing sides of said first valve disk.

86. The shock absorber of claim 85, wherein said valve body further comprises a second recessed portion cooperating with said second valve disk to create a second pressure chamber, said second solenoid operable to selectively increase the pressure inside said second pressure chamber so as to create a pressure differential on opposing sides of said second valve disk.

87. The shock absorber of claim 86, wherein said first solenoid permits selective fluid communication between said first pressure chamber and said first portion of said working chamber when said solenoid is open.

88. The shock absorber of claim 87, wherein said second solenoid permits selective fluid communication between said second pressure chamber and said second portion of said working chamber.

89. The shock absorber of claim 88, wherein said first plurality of vertical flow passages is in fluid communication with said first pressure chamber.

90. The shock absorber of claim 89, wherein said second plurality of vertical flow passages is in fluid communication with said second pressure chamber.

91. A method for regulating the flow of damping fluid through a piston disposed between the first and second portions of the working chamber of the direct acting shock absorber, said piston being supported in said working chamber by a piston support member, said shock absorber operable to damp movement of the body of an automobile, said method comprising the steps of:

recording the output of a first sensor means for determining the difference in pressure between the damping fluid in said first and second portions of said working chamber so as to determine whether said shock absorber is in compression or rebound, said first sensor means operable to generate a first electrical signal in response to the difference in pressure between the damping fluid stored in said first and second portions of said working chamber, said first sensor means being disposed within said piston support member;

recording the output of a second sensor means for determining the vertical velocity of a body of said automobile, said second sensor means operable to generate a second electrical signal in response to the movement of the body of said automobile, said second sensor means being disposed within said piston support member;

generating an electrical control signal in response to said first and second electrical signals, said electrical control signal being responsive to whether said shock absorber is in compression or rebound and to whether the vertical velocity of the body of said automobile exceeds a predetermined value; and regulating the flow of damping fluid through said piston by an electrical controllable flow means in response to said electrical control signal.

92. The method of claim 91, wherein said first sensor means comprises a pressure sensor having a first surface communicating with a damping fluid stored in said first portion of said working chamber, said pressure sensor further having a second surface communicating with the damping fluid stored in said second portion of said working chamber.

93. The method of claim 91, wherein said second sensor means comprises an accelerometer.

94. The method of claim 91, wherein said electrical controllable flow means comprises a solenoid, said solenoid operable to regulate the flow of damping fluid between said first and second portions of said working chamber.

95. The method of claim 91, wherein said piston comprises a valve body and a first and a second valve disk biased against opposing surfaces of said valve body, said valve body having a first plurality of vertical flow passages operatively associated with said first and second valve disks to permit damping fluid to flow from said first portion of said working chamber to said second portion of said working chamber when the pressure of the damping fluid in said first portion of said working chamber is greater than the pressure of the damping fluid in said second portion.

96. The method of claim 95, wherein said valve body comprises a second plurality of vertical flow passages, said second plurality of vertical flow passages operatively associated with said first and second valve disks to permit damping fluid to flow from said second portion of said working chamber to said first portion of said working chamber when the pressure of the damping fluid in said second portion is greater than the pressure of the damping fluid in said first portion.

97. The method of claim 96, wherein said electrical controllable flow comprises a solenoid, said solenoid is operable to selectively create a pressure differential on opposing sides of said first valve disk thereby counter-biasing said first valve disk.

98. The method of claim 97, wherein said solenoid is further operable to selectively create a pressure differential on opposing sides of said second valve disk thereby counter-biasing said second valve disk.

99. The method of claim 98, wherein said valve body further comprises a first recessed portion cooperating with said first valve disk to create a first pressure chamber, said solenoid operable to selectively increase the pressure inside said first pressure chamber so as to create a pressure differential on opposing sides of said first valve disk.

100. The method of claim 99, wherein said valve body further comprises a second recessed portion cooperating with said second valve disk to create a second pressure chamber, said solenoid operable to selectively increase the pressure inside said second pressure chamber so as to create a pressure differential on opposing sides of said second valve disk.

101. The method of claim 100, wherein said shock absorber further comprises a piston post operable to support said valve body.

102. The method of claim 101, wherein said solenoid further comprises a sealing plate, said sealing plate having a central flow passage and a plurality of radially displaced flow passages, said central flow passage being in fluid communication with said second portion of said working chamber, said radially displaced flow passages being in fluid communication with said second pressure chamber through a flow passage in said valve body and a flow passage in said piston post.

103. The method of claim 102, wherein said first pressure chamber is in fluid communication with said second pressure chamber.

104. The method of claim 103, wherein said second pressure chamber is in fluid communication with at least one of said second plurality of vertical flow passages.

105. The method of claim 104, wherein said solenoid further comprises an armature operable to engage said sealing plate when said solenoid is closed.

106. The method of claim 105, wherein said armature is operable to prevent the flow of damping fluid between said central flow passage and said radially displaced flow passages when said solenoid is closed.

107. The method of claim 106, wherein said solenoid further comprises a spring is operable to bias said armature in a direction away from said sealing plate.

108. The method of claim 107, wherein said armature has a central bore operable to permit damping fluid from said second portion of said working chamber to flow therethrough.

109. The method of claim 108, wherein said solenoid further comprises a solenoid housing and a housing cap, said housing cap having an axial flow passage in fluid communication with said central bore of said armature.

110. The method of claim 109, wherein said piston further comprises an annular member disposed within said piston post between said piston rod and said solenoid housing.

111. The method of claim 110, wherein said annular member has an axial flow passage and a radially extending flow passage, said radially extending flow passage permitting fluid communication between the first portion of said working chamber and said axial flow passage through a flow passage in said piston post.

112. The method of claim 111, wherein said hock absorber further comprises a pressure sensor, said pressure sensor having a first surface communicating with said axial flow passage of said annular member, said pressure sensor having a second surface in fluid communication with said axial flow passage in said housing cap.

113. The method of claim 112, further comprising an accelerometer disposed on said annular member.

114. A method for regulating the flow of damping fluid between the first and second portions of a direct acting shock absorber, said shock absorber able to damp movement between the body and a wheel of an automobile, said method comprising the steps of:
  determining whether the frequency of the vertical movement of the body of said automobile is substantially equal to a first predetermined value;
  determining whether the frequency of the vertical movement of the wheel of said automobile is substantially equal to a second predetermined value by sensing the difference in pressure between the damping fluid in said first and second portions of said working chamber; and
  regulating the flow of damping fluid through a piston disposed between said first and second portions of said working chamber in response to whether the frequency of the body of said automobile is substantially equal to a first predetermined value and whether the frequency of vertical movement of the wheel of said automobile is substantially equal to a second predetermined value.

115. The method of claim 114, wherein said step of determining whether the frequency of the vertical movement of the body of said automobile is substantially equal to said first predetermined value comprises the step of integrating the output of an accelerometer which moves in unison with the body of said automobile.

116. The method of claim 114, wherein said step of determining whether the frequency of the vertical movement of the wheel of said automobile is substantially equal to said second predetermined value comprises the step of recording the pressure differential between said first and second portions of said working chamber and calculating the value of $A^2$ according to the following equation:

$$A^2 = \left[ \left( \sum_{t=0}^{T} P_t \times \sin \frac{2\pi t}{T} \right)^2 + \left( \sum_{t=0}^{T} P_t \times \cos \frac{2\pi t}{T} \right)^2 \right]$$

where:
  $P_t$ is the differential pressure between the upper portion and the lower portion of said working chamber at time t; and
  T is the period of the natural frequency of the wheel of said automobile.

117. A method for regulating the flow of damping fluid between the first and second portions of a working chamber of a direct acting shock absorber during compression and rebound, said shock absorber operable to damp the movement of the body of an automobile, said method comprising the steps of:
  recording the output of a pressure sensor disposed between the first and second portions of said working chamber to determine whether said shock absorber is in compression or rebound;
  sensing the vertical movement of the body of said automobile;
  determining whether the vertical velocity of the body of said automobile exceeds a predetermined value; and
  regulating the flow of damping fluid through a piston disposed between said first and second portions of said working chamber in response to whether the vertical velocity of the body of said automobile exceeds said predetermined value and whether said shock absorber is in compression or rebound.

118. The method of claim 117, wherein the step of determining whether the vertical velocity of the body of said automobile exceeds said predetermined value comprises the step of integrating the output of an accelerometer, said accelerometer operable to sense the vertical acceleration of the body of said automobile.

119. The method of claim 117, wherein said step of regulating the flow of damping fluid comprises the step of increasing the flow of damping fluid between said first and second portion of said working chamber during both compression and rebound when the magnitude of the vertical velocity of the body of said automobile is below said predetermined value.

120. The method of claim 119, wherein said step of regulating the flow of damping fluid comprises the step of increasing the flow of damping fluid between said first and second portions of said working chamber during rebound and decreasing the flow during compression when the vertical velocity of the body of said automobile is downward and the magnitude of said vertical velocity exceeds said predetermined value.

121. The method of claim 120, wherein said step of regulating the flow of damping fluid comprises the step of decreasing the flow of damping fluid between said first and second portions during rebound and increasing the flow during compression when the vertical velocity of the body of said automobile is upward and the magnitude of said vertical velocity exceeds said predetermined value.

122. A method for regulating the flow of damping fluid between first and second portions of the working chamber of a direct acting shock absorber having a piston disposed therein, said shock absorber operable to damp the movement of the body of an automobile, said method comprises;
  recording the output of a pressure sensor disposed between said first and second portions of said working chamber;
  determining whether said shock absorber is in compression or rebound by using the output of said pressure sensor;
  determining the vertical velocity of said piston disposed within said shock absorber; and
  determining whether the vertical velocity of said piston exceeds a predetermined value; and
  regulating the flow of damping fluid between said first and second portions of said working chamber in response to the vertical velocity of said piston and whether said shock absorber is in compression or rebound.

123. The method of claim 121, wherein said step of regulating the flow of damping fluid between said first and second portions of said working chamber comprises the step of decreasing the flow of damping fluid between said first and second portions during compression when the magnitude of the vertical velocity of said piston exceeds said predetermined value.

124. The method of claim 123, wherein said step of regulating the flow of damping fluid between said first and second portions comprises the step of decreasing the flow of damping fluid between said first and second portions when the magnitude of the vertical velocity of said piston exceeds said predetermined value.

125. A method for regulating the flow of damping fluid between first and second portions of a working chamber of a shock absorber, said shock absorber operable to damp movement of the body and a wheel of an automobile, said method comprising the steps of:

recording the output of a pressure sensor disposed between said first and second portions of said working chamber during a predetermined length of time;

calculating the value of $A^2$ according to the following equation:

$$A^2 = \left[\left(\sum_{t=0}^{T} P_t \times \sin\frac{2\pi t}{T}\right)^2 + \left(\sum_{t=0}^{T} P_t \times \cos\frac{2\pi t}{T}\right)^2\right]$$

where:

$P_t$ is the differential pressure between the first and second portions of said working chamber at time t;

T is the period of the natural frequency of the wheel of said automobile; and decreasing the flow of damping fluid between said first and second portions of said working chamber during compression of said shock absorber when the value of $A^2$ exceeds a predetermined value.

126. The method of claim 125, further comprising the additional step of decreasing the flow of damping fluid between said first and second portions of said working chamber during rebound of said shock absorber when the value of $A^2$ exceeds said predetermined value.

127. A method for regulating the flow of damping fluid through a piston disposed between first and second portions of the working chamber of a direct acting hydraulic shock absorber, said piston being supported by a piston support member, said shock absorber being disposed between the sprung and unsprung portions of an automobile, said method comprising the steps of:

sensing the pressure differential between said first and second portions of said working chamber so as to permit determination of whether said shock absorber is in compression or rebound by recording the output of first sensor means disposed within said piston support member;

sensing the vertical movement of the sprung portion of said vehicle by recording the output of second sensor means disposed within said piston support member;

determining whether the vertical velocity of the body of said automobile exceeds a predetermined value;

regulating the flow of damping fluid into said first portion of said working chamber by a first electrical controllable flow means for regulating the flow of damping fluid into said first portion of said working chamber; and regulating the flow of damping fluid into said second portion of said working chamber by a second electrical controllable flow means operable to regulate the flow of damping fluid into said second portion of said working chamber, said first and second electrical controllable flow means being operable to regulate the flow of damping fluid through said piston in response to whether the vertical velocity of the body of said automobile exceeds said predetermined value and whether said shock absorber is in compression or rebound.

128. The method of claim 127, wherein said step of sensing the pressure differential between said first and second portions of said working chamber comprises the step of recording the output from a pressure sensor disposed between said first and second portions of said working chamber, said pressure sensor operable to sense the pressure differential between the damping fluid in said first and second portions of said working chamber.

129. The method of claim 127, wherein said step of sensing the vertical velocity of the sprung portion of said vehicle comprises the step of recording the output of an accelerometer disposed within said shock absorber.

130. The method of claim 127, wherein said first electrical controllable flow means comprises a first solenoid, said first solenoid operable to regulate the flow of damping fluid into said first portion of said working chamber.

131. The method of claim 130, wherein said second electrical controllable flow means further comprises a second solenoid, said second solenoid operable to regulate the flow of damping fluid into said second portion of said working chamber.

132. The method of claim 131, wherein said step of regulating the flow of damping fluid into said first portion of said working chamber comprises the step of delivering the output from said pressure sensor and said accelerometer to a signal conditioning circuit operable to amplify the outputs from said pressure sensor and said accelerometer.

133. The method of claim 132, wherein said step of regulating the flow of damping fluid into said first portion of said working chamber further comprises the step of delivering the output from said signal conditioning circuit to a computer electrically communicating with said signal conditioning circuit, said computer operable to generate an output in response to the output of said signal conditioning circuit.

134. The method of claim 133, wherein said step of regulating the flow of damping fluid into said first portion of said working chamber further comprises the step of delivering the output of said computer to a solenoid driving circuit operable to convert the output of said computer into voltage levels which may be used to energize said first solenoid.

135. The method of claim 134, wherein said solenoid driving circuit is further operable to convert the output of said signal conditioning circuit into an output which may be used to energize said first solenoid.

136. The method of claim 135, wherein said solenoid driving is further operable to convert the output of said computer into voltage levels which may be used to energize said second solenoid.

137. The method of claim 136, wherein said solenoid driving circuit is further operable to convert the output of said signal conditioning circuit into an output which may be used to energize said second solenoid.

138. The method of claim 132, wherein said piston comprises a valve body and a first and a second valve disk biased against opposing surfaces of said valve body, said valve body having a first plurality of vertical flow passages operatively associated with said first and second valve disks to permit damping fluid to flow from said first portion of said working chamber to said second portion of said working chamber when the pressure of the damping fluid in said first portion of said working chamber is greater than the pressure of the damping fluid in said second portion.

139. The method of claim 138, wherein said valve body comprises a second plurality of vertical flow passages, said second plurality of vertical flow passages operatively associated with said first and second valve disks to permit damping fluid to flow from said second portion of said working chamber to said first portion of said working chamber when the pressure of the damping fluid in said second portion is greater than the pressure of the damping fluid in said first portion.

140. The method of claim 139, wherein said valve body further comprises a first recesses portion cooperating with said first valve disk to create a first pressure chamber, said first solenoid operable to selectively increase the pressure inside said first pressure chamber so as to create a pressure differential on opposing sides of said first valve disk.

141. The method of claim 140, wherein said valve body further comprises a second recessed portion cooperating with said second valve disk to create a second pressure chamber, said second solenoid operable to selectively increase the pressure inside said second pressure chamber so as to create a pressure differential on opposing sides of said second valve disk.

142. The method of claim 141, wherein said first solenoid permits selective fluid communication between said first pressure chamber and said first portion of said working chamber when said solenoid is open.

143. The method of claim 142, wherein said second solenoid permits selective fluid communication between said second pressure chamber and said second portion of said working chamber.

144. The method of claim 143, wherein said first plurality of vertical flow passages is in fluid communication with said first pressure chamber.

145. The method of claim 144, wherein said second plurality of vertical flow passages is in fluid communication with said second pressure chamber.

* * * * *

UNITED STATES PATENT AND TRADEMARK OFFICE
CERTIFICATE OF CORRECTION

PATENT NO. : 5,020,825

DATED : Jun. 4, 1991

INVENTOR(S) : Magnus B. Lizell

It is certified that error appears in the above-identified patent and that said Letters Patent is hereby corrected as shown below:

On The Title Page, U.S. Pat. Documents: "4,695,379" should be --4,696,379--;

Col. 1, Line 56, after "variation" insert --in--;

Col. 2, Lines 1-3, delete paragraph;

Col. 3, Line 1, delete "is" after --invention--;

Col. 3, Line 59, "is" should be --are--;

Col. 6, Line 61, "biases" should be --bias--;

Col. 7, Line 31, delete "portion" after --threaded--;

Col. 8, Line 25, "than" should be --then--;

Col. 8, Line 61, "than" should be --then--;

Col. 11, Line 33, after "voltage" insert --is produced--;

Col. 11, Line 63, "P" should be --$\bar{P}$--;

Col. 15, Line 23, "value" should be --valve--;

Col. 16, Line 20, "biases" should be --bias--;

Col. 16, Line 52, "axially" should be --axial--;

Col. 19, Line 32, "in" should be --in.--;

Col. 19, Line 33, "in" should be --in.--;

Col. 19, Line 68, "is" should be --are--;

Col. 20, Line 3, "within" should be --without--;

Col. 20, Line 48, Claim 1, "valve,and;" should be --valve; and--;

Col. 20, Line 48, Claim 1, before "electrical" insert a paragraph;

Col. 20, Line 66, Claim 5, "A" should be --The--;

Col. 24, Line 54, Claim 33, "inresponse" should be --in response--;

Col. 24, Line 68, Claim 36, before "being" insert --circuit--;

Col. 28, Line 4, Claim 69, "The" should be --A--;

UNITED STATES PATENT AND TRADEMARK OFFICE
CERTIFICATE OF CORRECTION

PATENT NO. : 5,020,825

DATED : Jun. 4, 1991

INVENTOR(S) : Magnus B. Lizell

It is certified that error appears in the above-identified patent and that said Letters Patent is hereby corrected as shown below:

Col. 28, Line 11, Claim 69, "communicating" should be --communication--;

Col. 30, Line 21, Claim 83, "position" should be --portion--;

Col. 32, Line 47, Claim 107, delete "is" after --spring--;

Col. 32, Line 67, Claim 112, "hock" should be --shock--;

Col. 34, Line 19, Claim 119, "portion" should be --portions--;

Col. 34, Line 44, Claim 122, delete ";" after "comprises" and insert --steps of:--;

Col. 35, Line 25, Claim 125, before "decreasing" insert a paragraph;

Col. 36, Line 61, Claim 138, "claim 132" should be --claim 137--;

Col. 37, Line 14, Claim 140, "recesses" should be --recessed--.

Signed and Sealed this

Twelfth Day of January, 1993

Attest:

DOUGLAS B. COMER

*Attesting Officer*    *Acting Commissioner of Patents and Trademarks*